(12) United States Patent
Ikeda

(10) Patent No.: US 6,443,650 B2
(45) Date of Patent: Sep. 3, 2002

(54) CONNECTION STRUCTURE OF LATERAL INSERT TYPE YOKE AND SHAFT

(75) Inventor: Shuhei Ikeda, Maebashi (JP)

(73) Assignee: NSK Ltd., Tokyo (JP)

( * ) Notice: Subject to any disclaimer, the term of this patent is extended or adjusted under 35 U.S.C. 154(b) by 73 days.

(21) Appl. No.: 09/774,094

(22) Filed: Jan. 31, 2001

(30) Foreign Application Priority Data

Feb. 3, 2000 (JP) ....................................... 2000-026701
Jul. 26, 2000 (JP) ....................................... 2000-225459

(51) Int. Cl.$^7$ ............................................... F16D 3/16
(52) U.S. Cl. ........................................ 403/12; 403/290
(58) Field of Search ............................ 403/12, 24, 155, 403/373, 290, DIG. 14; 464/134, 135, 901; 248/544; 15/250.46

(56) References Cited

U.S. PATENT DOCUMENTS

| | | | |
|---|---|---|---|
| 4,900,178 A | * 2/1990 | Haldric et al. | 403/12 |
| 5,090,833 A | 2/1992 | Oertle et al. | 403/12 |
| 5,358,350 A | 10/1994 | Oertle | 403/12 |
| 6,155,739 A | * 12/2000 | Sekine et al. | 403/12 |

FOREIGN PATENT DOCUMENTS

| | | |
|---|---|---|
| EP | 0 309 344 B1 | 5/1991 |
| GB | 1 410 731 | 10/1975 |
| GB | 2 346 652 | 8/2000 |
| JP | 6-78630 | 11/1994 |
| JP | 2735260 | 1/1998 |
| JP | 10-148215 | 6/1998 |
| JP | 10-169664 | 6/1998 |
| JP | 10-318272 | 12/1998 |
| JP | 11-30241 | 2/1999 |
| JP | 11-280777 | 10/1999 |
| JP | 11-280781 | 10/1999 |

* cited by examiner

*Primary Examiner*—Robert E. Pezzuto
(74) *Attorney, Agent, or Firm*—Miles & Stockbridge P.C.

(57) ABSTRACT

A connection structure of a yoke and a shaft comprises a shaft including a pair of flat surfaces formed in parallel to each other on an outer peripheral surface of a front side end thereof, a yoke having a connection portion, formed at one side end thereof, for connecting the shaft, and having the other side end connected to a universal joint. The connection portion includes holding members, for holding the flat surfaces of the shaft, taking substantially a U-shape in section within a plane orthogonal to an axial direction thereof, a screw hole formed in the vicinity of one side end of the U-shape, and a bolt hole formed in the vicinity of the other side end thereof, concentric with the screw hole and having a diameter larger than the screw hole. This connection structure functions to insert from the bolt hole a bolt externally fitted with a cam member having a fitting hole by inserting the shaft in between the holding members, then screw the bolt into the screw hole, thus join the shaft to the joint portion, and perform centering of the shaft with the rotations of the cam member. The cam member is movable on the bolt facing at least a part of the shaft in the axial direction of the bolt, and the bolt is provided with a frictional engagement portion frictionally engaging with the cam member and rotating the cam member when the bolt is screwed into the screw hole and fastened thereto.

4 Claims, 23 Drawing Sheets

FIG. 12A
FIG. 12B
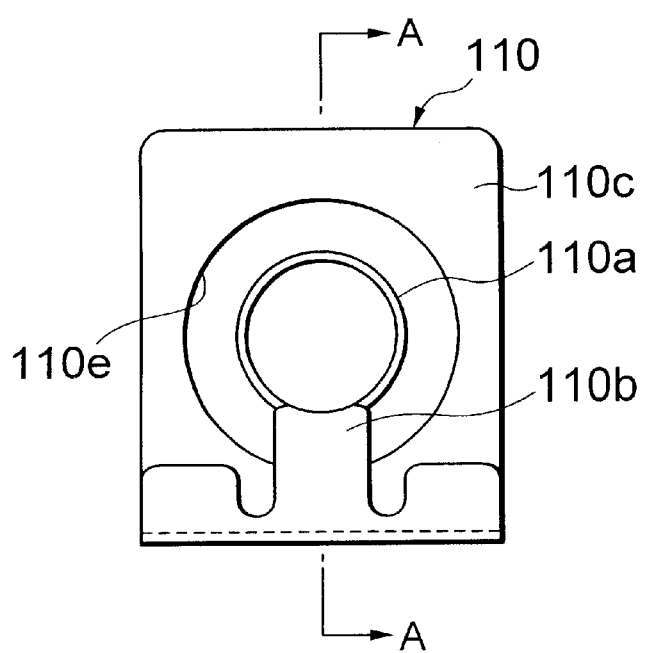
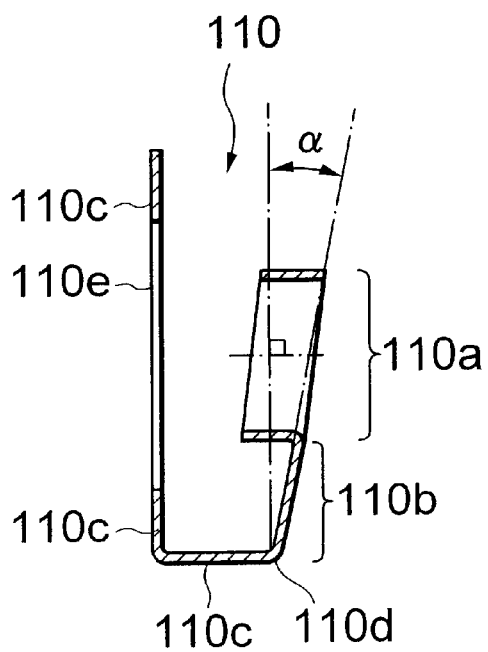

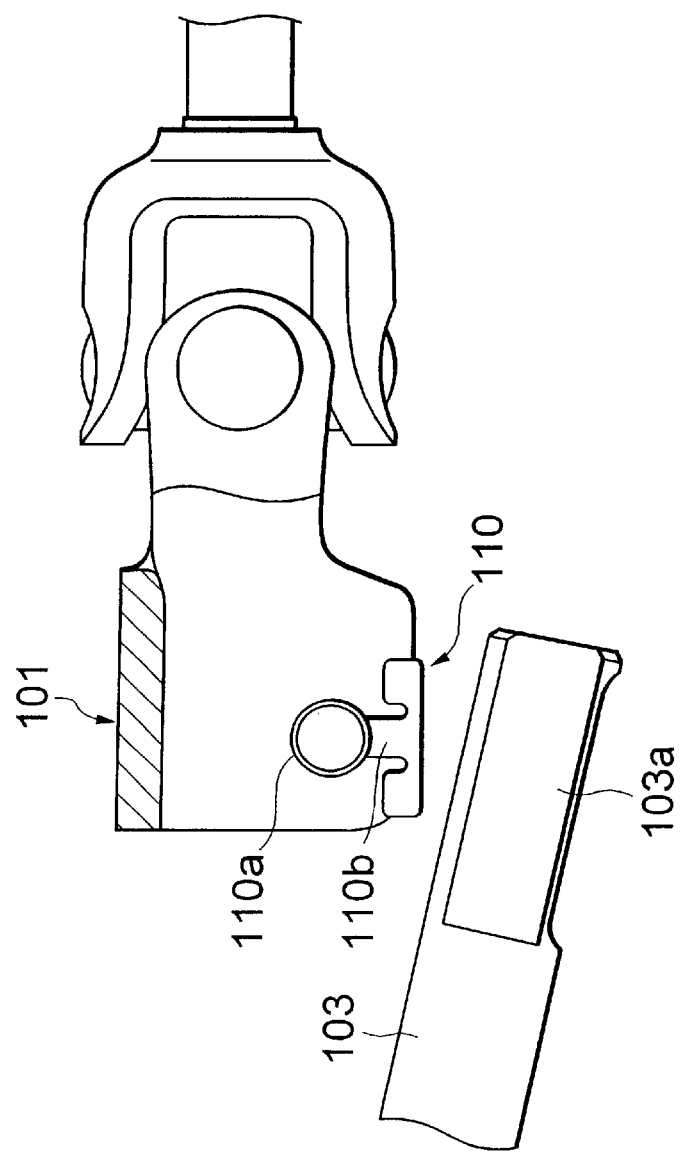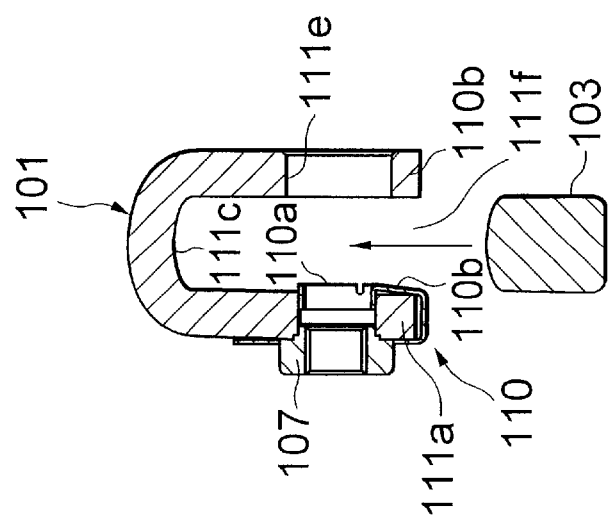

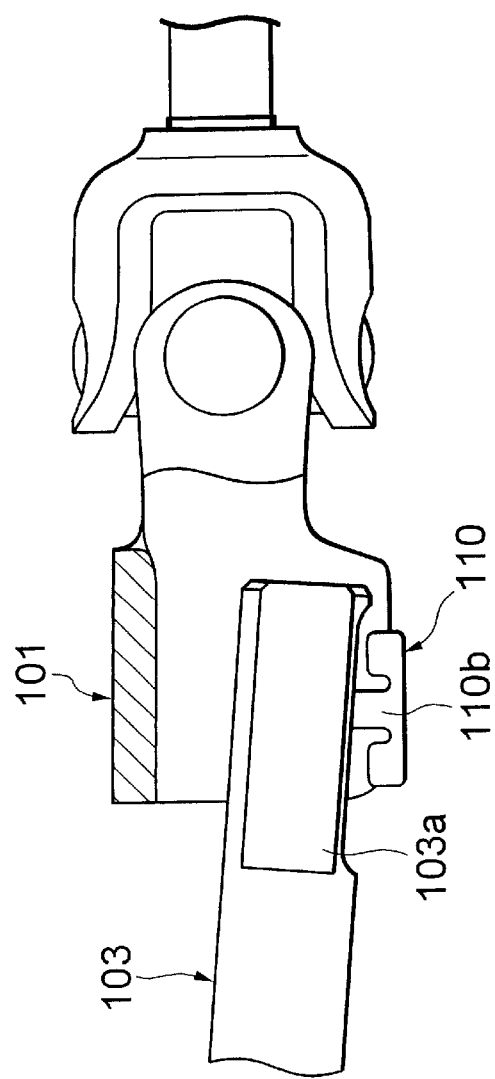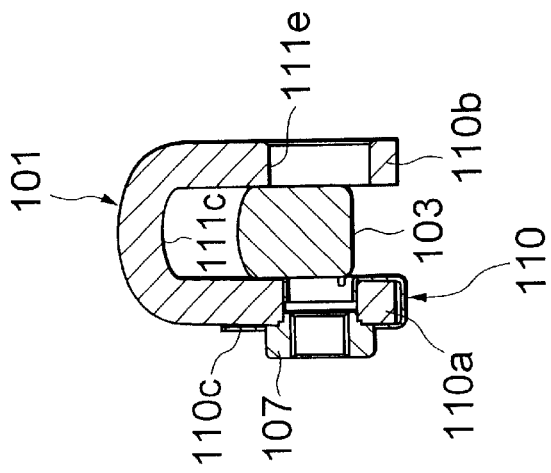

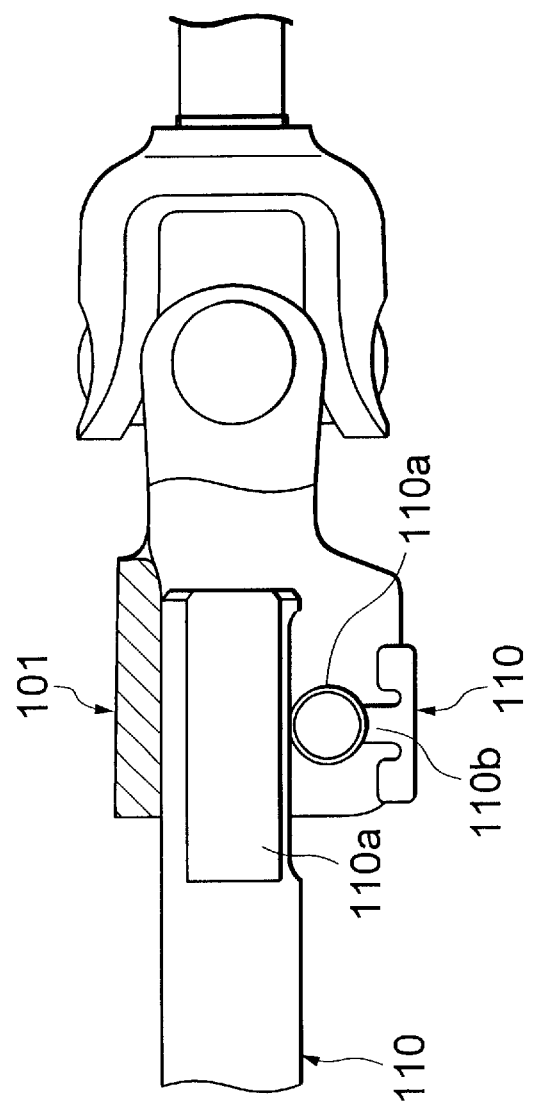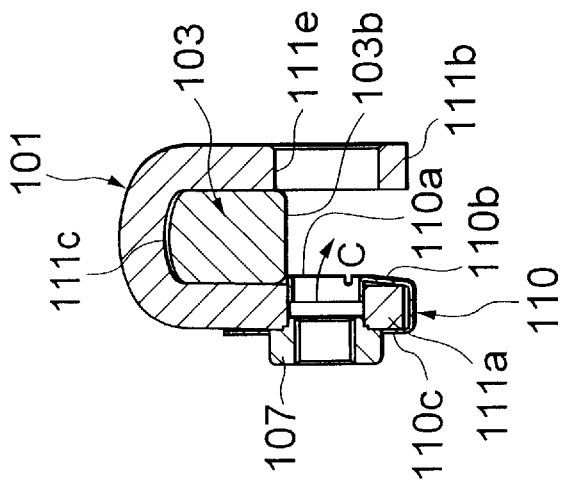

CONNECTION STRUCTURE OF LATERAL INSERT TYPE YOKE AND SHAFT

This application claims the benefit of Japanese Patent Applications No. 2000-026701 and 2000-225459 which are hereby incorporated by reference.

BACKGROUND OF THE INVENTION

1. Field of the Invention

The present invention relates to a connection structure of a lateral insert type yoke and a shaft, used for a steering device etc of an automobile, for connecting the shaft to the lateral insert type yoke with its one side end to which a universal joint is connected.

2. Related Background Art

A steering device for giving a steering angle to a front wheel of the automobile is generally constructed to transfer a motion of a steering shaft rotating with an operation of a steering wheel to an input shaft of a steering gear via a spider type universal joint.

This universal joint is constructed such that a couple of U-shaped yokes are axially supported each other via a spider or cross shaft. In the case of assembling the steering device by use of this type of universal joint, for example, one yoke is previously joined and fixed by welding or fastening with a screw to a side end of one shaft such as the steering shaft etc, and the other yoke is joined to a side end of the other shaft. Normally, for executing this assembling operation, after one shaft has been supported on a vehicle body, this shaft and the other shaft are joined through the universal joint. Accordingly, what is preferable is a so-called lateral insert type yoke in which at least one yoke of those two yokes of the universal joint can perform the fixing operation without moving the shaft in an axial direction.

This lateral insert type yoke is constructed of a member constituting one part of the universal joint, and a joint member provided integrally with this member and taking a U-shape in section within a plane orthogonal to the axial direction. A side end of the shaft taking a sectional configuration suited to the concave of the U-shape, is inserted sideways from an opening into the concave area of the U-shaped joint member then, two pieces of side end portions extending in parallel of the U-shape are penetrated, screwed and fastened with a bolt, thereby joining the shaft to the lateral insert type yoke. On this occasion, it is a general practice that a cam (cam member) provided integrally with the bolt or given a predetermined frictional resisting force performs positioning (centering) within the joint member of the shaft.

Thus, an assembling method in the conventional connection structure of the lateral insert type yoke and the shaft, in which the cam provided at the bolt performs centering of the shaft, is roughly classified into two types. One type is, as disclosed in, e.g., Japanese Patent Application Laid-Open Publication No. 10-318272, that the nut is fastened by use of a cam bolt. The other type is, as disclosed in Japanese Patent Application Laid-Open Publication Nos. 10-169664 and 10-148215, that the bolt is fastened.

In the former assembling method in the conventional connection structure of the lateral insert type yoke and the shaft, for convenience of fastening the nut, the assembling operation is required to be carried out in the following way. After the bolt has been inserted from backward, and a front side end of the bolt is protruded on the near side, or after the bolt has been inserted from the near side, the universal joint is rotated through 180 degree, and the nut is set on the near side. However, the intrusion of the bolt from the backward may be done by groping invisible to eyes, which might not be easy. Further, a labor is needed for rotating the universal joint through 180 degrees, resulting in an increase in the number of steps of the operation.

Moreover, there is needed a bolt temporary holding mechanism for supporting the bolt so as not to be pushed backward till the nut is screwed once or twice along the front side end of the bolt. The head of the bolt must be held by turning the hands backwards if this mechanism is not used. This operation is laborious enough to use both of the hands. Thus, some problems have existed in the former method.

Further, in the latter assembling method, the bolt is inserted from the near side and fastened as it is. Therefore, unlike the former method, there is no necessity of inserting the bolt from backward and rotating the universal joint through 180 degree. When in the assembly, it is required for ensuring the fastening by a tool that after the bolt has been inserted by the hand, the front side end of the screw portion of the bolt is lightly screwed once or twice into the nut fixed to the yoke or into a thread portion (thread forming portion) of the yoke, and final fastening is effected. As described above, however, the cam member of the bolt is fitted to the screw portion with a predetermined frictional resisting force, and a load resistance for rotating the bolt is large. Hence, there arises a problem, wherein the front side end of the screw portion can not be lightly screwed into the nut or the thread portion of the yoke by pinching the head of the bolt.

According to the former method of those assembling methods, for the convenience of fastening the nut, after the bolt has been inserted from backward, the front side end of the bolt is protruded on the near side, or after the bolt has been inserted from the near side, the universal joint is rotated through 180 degrees, and it is required that the nut be set on the near side. According to the latter method of fastening the bolt, however, the bolt is inserted from the near side and fastened as it is. Therefore the latter method has more of operability than the former method.

According to the assembling method of fastening the bolt on the near side, however, the nut is required to be fitted to the yoke so as not to come off or rotate. Further, there is a drawback in which a shaft 203 inserted into a yoke 201 is, as shown in FIG. 23, easy to come off till the bolt is inserted and at first screwed into the nut, and hence the assembly needs an operation while supporting the shaft 203 with the hands.

Such being the case, there have been proposed several assembling methods capable of fastening the bolt without supporting the shaft with the hands. Patent Publication No. 2735260 discloses that a special nut including a rotation stopper and a bolt-insert-sided portion formed comparatively long, is slidably held in a nut hole of the yoke by use of a leaf spring member, and, after inserting the shaft into the yoke, the shaft is held by the bolt-insert-sided portion of the nut.

Further,. U.S. Pat. No. 5,358,350 discloses that a temporary holding clip taking substantially a C-shape and including an engagement portion defined as a protruded member with its one side end warped outwards, is fitted into one side end of the yoke with this engagement portion being set inwards, when the shaft is inserted, the engagement portion is pushed to permit the shaft to pass through, the warp of the engagement portion elastically reverts after the shaft has passed through, and this engagement portion engages with the shaft, thus temporarily holding the shaft.

Japanese Patent Application Laid-Open Publication No. 11-280777 discloses that a shaft 203 is, as shown in FIG. 24, let through a hole 214 of a temporary stopper 208 for joint, when set in a concave portion of a yoke 201, a pawl 215 of the joint temporary stopper 208 is caught by a rear surface side of the yoke 201, and the shaft 203 is thereby temporarily held.

Japanese Patent Application Laid-Open Publication No. 1130241 discloses that a clip 220 having, as shown in FIG. 26, a protruded portion 220a elastically shiftable in an arrow direction, is internally fixedly fitted into a bolt hole 211e of a yoke 201 as shown in FIG. 25, when the shaft 203 is inserted from an arrow direction, the protruded portion 220a is intruded into the bolt hole 211e to permit the shaft 203 to pass through, when the shaft 203 is fitted into the concave portion of the yoke 201, the protruded portion 220a elastically reverts to its original shape, and the front side end of the protruded portion engages with the shaft 203.

The Japanese Patent Application Laid-Open No. 11-280781 discloses that, when inserting the shaft protruded portions 330a provided in a bolt through-hole 330b of a clip 330 are intruded into the bolt hole of the yoke, as shown in FIG. 27, to permit the shaft to passthrough, however, when the shaft is fitted into the concave portion of the yoke, the protruded portions 330a elastically return to prevent the shaft from separating from the yoke.

Further, Japanese Utility Model Laid-Open Publication No. 6-78630 discloses that engagement holes are formed two internal side surfaces facing to each other within the yoke, engagement protrusions each having a size suited to fitting into each of the engagement holes are provided on an engagement cylinder externally fitted to the front side end of the shaft, when the shaft externally fitted with the engagement cylinder is inserted into the yoke, the engagement protrusions are fitted into the engagement hole, and the shaft is thus temporarily held by the yoke.

Among the conventional shaft temporary holding structures of the lateral inset type yokes, however, the structure disclosed in Patent Publication No. 2735260 has such a problem that the special nut formed with the rotation stopper involves a high cost, and besides the nut might come off when screwed by applying the bolt.

Further, the following is a problem inherent in the structure disclosed in U.S. Pat. No. 5,358,350. A temporary holding clip 421 is, as shown in FIG. 28, attached to one side end of a yoke 401, and a spacing d from the clip 421 needs to be provided for permitting the shaft 403 to pass through. This spacing d, however, becomes large when considered in terms of a size of the clip 421, and the two side ends of the yoke 401 diverge if the shaft 403 is set in this position. Therefore, it takes an extra time corresponding to the operation of fastening these two side ends by the bolt.

Moreover, according to Japanese Patent Application Laid-Open Publication No. 11-280777 illustrated in FIG. 24, a drawback is caused, wherein it is necessary that the assembly be done after letting the shaft 203 through the hole 214 of the joint temporary stopper 208, and the shaft 203 can not be inserted while the joint temporary stopper 208 is kept fitted to the yoke 201.

Further, according to Japanese Patent Application Laid-Open Publication No. 11-030241 illustrated in FIGS. 25 and 26, there is caused the following drawback. The front side end of the bolt catches the protruded portion 220a of the clip 220 when inserting the bolt, and hence the clip 220 might come off inwardly of the yoke 201. Further, when the clip 220 is attached to the yoke 201, there is no process of positioning the clip 20 in a rotational direction of the bolt in order to determine a direction of the protruded portion 220a, and hence an arbitrary positioning process must be executed.

In addition, according to Japanese Patent Application Laid-Open No. 11-280781, as shown in FIG. 29, a fitting portion 530c of the clip is inserted and fitted into a nut hole 511d of the yoke. Therefore, the nut hole 511d is required to be formed larger than a diameter of a bolt 506. For this reason, a backlash of the bolt 506 is large, with the result that a deviation easily occurs in centering of the shaft when assembled. Moreover, when fastening the bolt 506, the fitting portion 530c is interposed between the bolt 506 and the yoke, and this therefore causes a slack of the bolt.

Further, a problem inherent in Japanese Utility Model Laid-Open Publication No. 06-78630 is that the engagement hole needs to be formed in the internal side surface of the yoke, and working for this formation is not easy and leads to an increase in cost.

SUMMARY OF THE INVENTION

It is a first object of the present invention to provide a connection structure of a yoke and a shaft, which is capable of screwing a bolt into a yoke by a simple operation and of performing centering of the shaft in a construction where the bolt is inserted from a near side and fastened as it is.

To accomplish this object, according to one aspect of the present invention, a connection structure of a yoke and a shaft comprises a shaft including a pair of flat surfaces formed in parallel to each other on an outer peripheral surface of a front side end thereof, a yoke having a connection portion, formed at one side end thereof, for connecting the shaft, and having the other side end connected to a universal joint. The connection portion includes holding members, for holding the flat surfaces of the shaft, taking substantially a U-shape in section within a plane orthogonal to an axial direction thereof, a screw hole formed in the vicinity of one side end of the U-shape, and a bolt hole formed in the vicinity of the other side end thereof, concentric with the screw hole and having a diameter larger than the screw hole. This connection structure functions to insert from the bolt hole a bolt externally fitted with a cam member having a fitting hole by inserting the shaft in between the holding members, then screw the bolt into the screw hole, thus join the shaft to the joint portion, and perform centering of the shaft with the rotations of the cam member. The cam member is movable on the bolt facing at least a part of the shaft in the axial direction of the bolt, and the bolt is provided with a frictional engagement portion frictionally engaging with the cam member and rotating the cam member when the bolt is screwed into the screw hole and fastened thereto.

Further, according to the present invention, the part of the shaft may include a screw portion of the bolt, the frictional engagement portion of the bolt may include a large-diameter portion having a diameter larger than a diameter of the fitting hole of the cam member that is formed between the screw portion and a head of the bolt, and the large-diameter portion may be press-fitted into the fitting hole when the bolt is screwed into the screw hole and fastened thereto.

According another aspect of the present invention, a connection structure of a yoke and a shaft comprises a shaft including a pair of flat surfaces formed in parallel to each other on an outer peripheral surface of a front side end thereof, a yoke having a connection portion, formed at one side end thereof, for connecting the shaft, and having the other side end connected to a universal joint. The connection portion includes holding members, for holding the flat surfaces of the shaft, taking substantially a U-shape in section within a plane orthogonal to an axial direction thereof, a screw hole formed in the vicinity of one side end of the U-shape, and a bolt hole formed in the vicinity of the other side end thereof, concentric with the screw hole and having a diameter larger than the screw hole. This connection structure functions to insert from the bolt hole a bolt externally fitted with a cam member having a fitting hole by inserting the shaft in between the holding members, then screw the bolt into the screw hole, thus connect the shaft to the joint portion, and perform centering of the shaft with the rotations of the cam member. An inside diameter of the fitting hole of the cam member has a dimension enough to be movable with respect to a screw portion of the bolt. The bolt is provided with a large-diameter portion between the screw portion and the head, having such an outside diameter larger than an inside diameter of the fitting hole and a length as to be press-fittable into the fitting hole and to generate a frictional resisting force capable of centering after being press-fitted, and the screw portion is set to such a length that at least the large-diameter portion is not press-fitted into the fitting hole till a front side end of the screw portion is at first screwed into the screw hole.

With the construction described above, when the front side end of the screw portion of the bolt is at first screwed into the screw hole, the cam member is still movable on the bolt in the axial direction of the bolt, so that the bolt can be lightly screwed in twice or three times by pinching the head with the fingers. Thereafter, when the bolt is further screwed and thus fastened, the frictional engagement portion of the bolt frictionally engages with the cam member, thereby generating a frictional resisting force. Therefore, the bolt can not be screwed by fingers but can be screwed by a tool. The cam member thereby rotates with the rotations of the bolt, and the cam member intrudes the shaft into the concave portion of the U-shaped holding members, thus performing the centering.

It is a second object of the present invention to provide a shaft temporary holding clip of a lateral insert type yoke that is capable of temporarily holding the shaft so as not to come off till a bolt is screwed into a nut after the shaft has been inserted into the yoke, and preventing an interference with a fastening operation of the bolt with a simple construction.

To accomplish the second object, according to a further aspect of the present invention, there is provided a shaft temporary holding clip of a lateral insert type yoke, for connecting a shaft including a pair of flat surfaces formed in parallel to each other on an outer peripheral surface of a front side end thereof to its one side end, and connecting the other side end thereof to a universal joint. The clip comprises holding members, of which a portion for joining the shaft is formed in a U-shape in section within a plane orthogonal to an axial direction thereof, for holding the flat surfaces of the shaft, a nut hole, formed in the vicinity of a side end of one of the holding members, into which a nut is internally fixedly fitted, a bolt hole, formed in the vicinity of a side end of the other of the holding members, concentric with the nut hole and having a diameter larger than the nut hole, the clip working to temporarily hold the shaft till the bolt is inserted from the bolt hole and screwed into the nut after the shaft has been inserted in between the holding members, and being attached to a predetermined position of the holding members, a fitting portion externally fitted to a side end of one of the holding members inwards from outside along its configuration, a support portion formed so as to protrude from an internal side end portion of the fitting portion in a direction more inclined inwards by a predetermined angle than in a direction orthogonal to the axial direction of the bolt, of which a flexure acting in an outer direction with the internal side end serving as a fulcrum falls within a limit of elasticity, and an engagement portion integrally formed at a front side end of the support portion, and internally fitted into the nut hole or the bolt hole so as to be movable in the axial direction of the bolt. A part of the shaft slides while pushing the support portion when inserting the shaft in between the holding members. The engagement portion thereby moves back into the nut hole or the bolt hole to permit the shaft to pass through, and when the shaft is intruded into a concave area between the holding members, the engagement portion elastically returns to an original position and engages with the shaft.

With this construction, the shaft is inserted in between the holding members intruded into the concave portion of the holding members, at which stage the pressing of the shaft upon the support portion is canceled. The engagement portion thereby elastically returns to its previous position and engages with (temporary holds) the shaft. Accordingly, the bolt is screwed into the nut with a single hand without supporting the shaft with the hands, and can be fastened as it is.

BRIEF DESCRIPTION OF THE DRAWINGS

FIGS. 12A and 12B are a front view showing a shaft temporary holding clip of the lateral insert type yoke and a sectional view taken along the line A—A in FIG. 12A in a fifth embodiment of the present invention;

FIGS. 18A and 18B are a side sectional view showing a configuration in a state before inserting the shaft into the yoke, and a sectional view showing a front part thereof;

FIGS. 20A and 20B are a side sectional view showing a configuration in a state where the shaft is inserted into the yoke and passes through a temporary holding clip, and a sectional view showing a front part thereof;

FIGS. 21A and 21B are a side sectional view showing a configuration in a state where the shaft is intruded into the yoke and secured by the temporary holding clip, and a sectional view showing a front part thereof;

DESCRIPTION OF THE PREFERRED EMBODIMENTS

A first embodiment of the present invention will hereinafter be described with reference to the accompanying drawings.

Figure 1B:
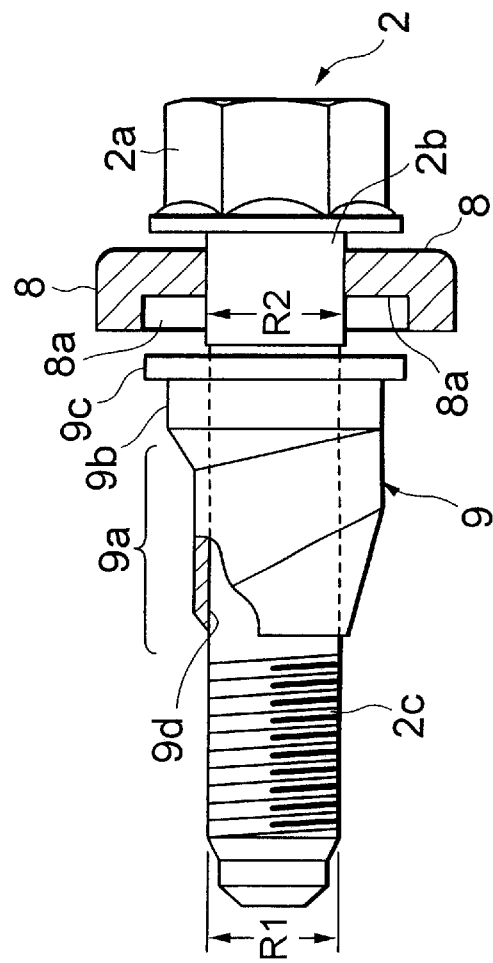
FIGS. 1A and 1B are sectional views each showing configurations of a lateral insert type yoke and a fastening bolt in a first embodiment of the present invention.
Figure 1A:
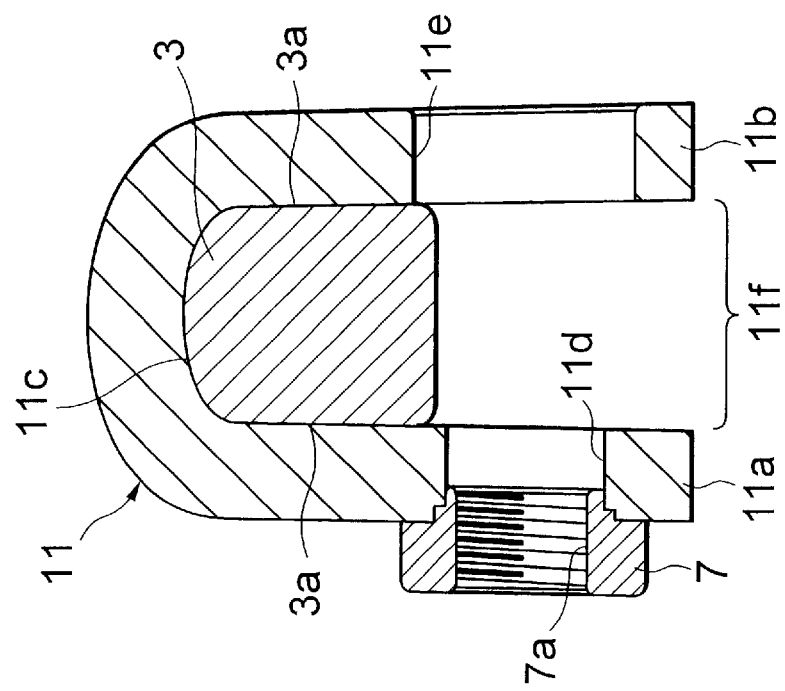
Figure 2:
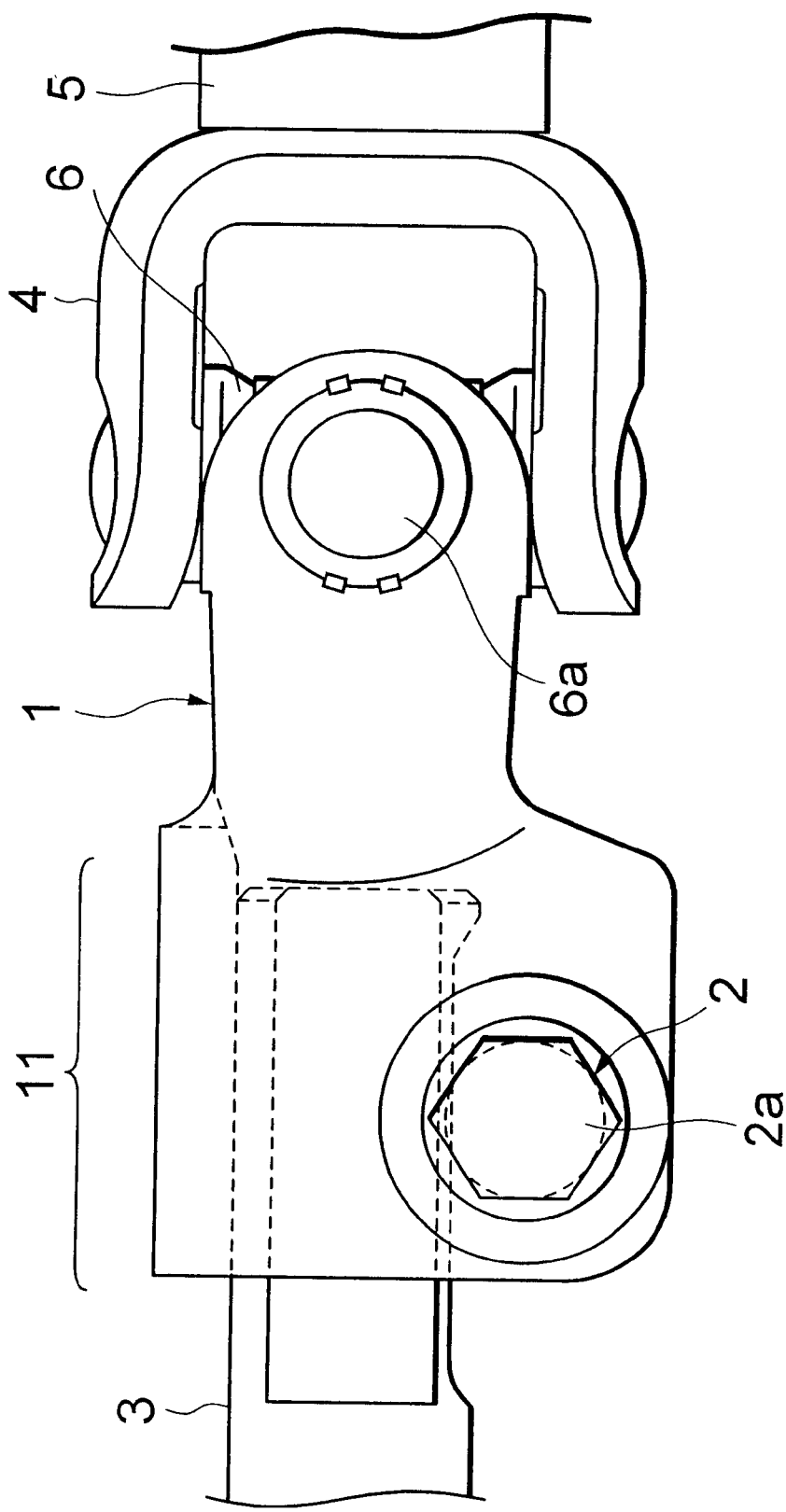
FIG. 2 is a view showing a whole construction of a universal joint including the lateral insert type yoke.
Figure 3:
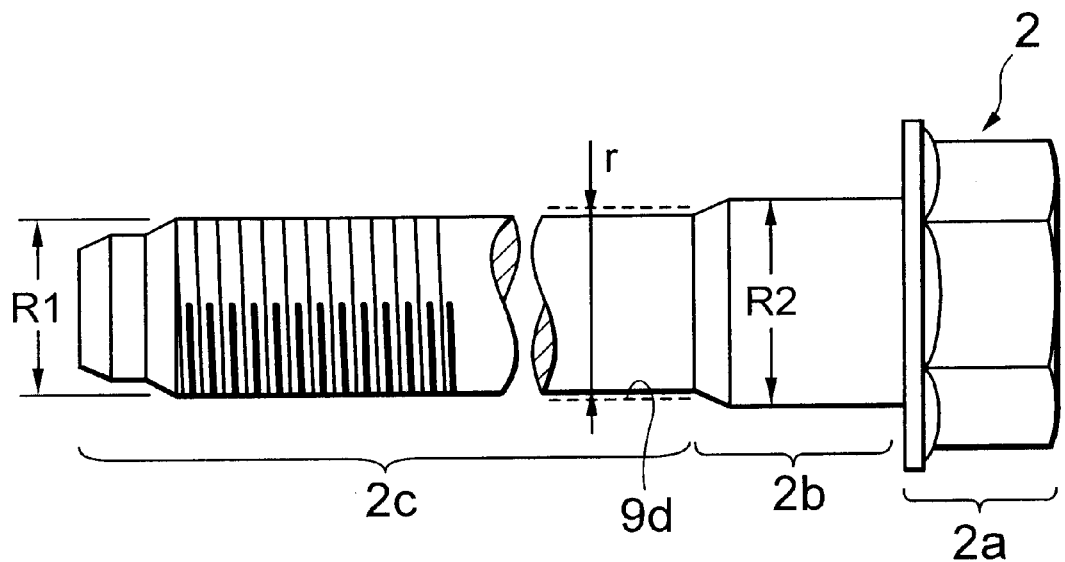
FIG. 3 is a side view showing a configuration of the fastening bolt.
Figure 4:
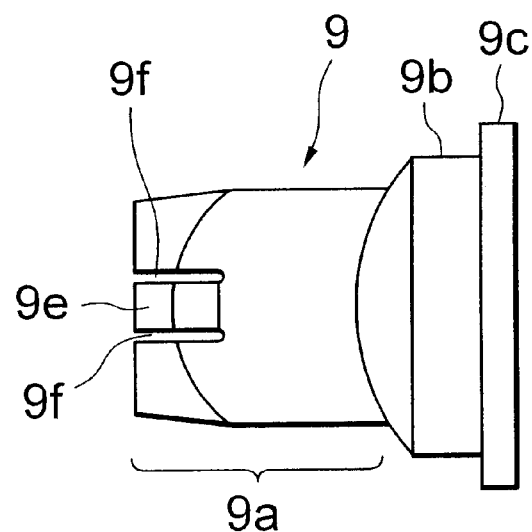
FIG. 4 is a top view showing a cam member.

FIGS. 1A and 1B are sectional views each showing a configuration of a lateral insert type yoke and a fastening bolt in a first embodiment of the present invention. FIG. 2 is a view showing a whole configuration of a universal joint including the lateral insert type yoke. FIG. 3 is a side view showing a configuration of the fastening bolt. FIG. 4 is a top view showing a cam member. FIGS. 5 through 8 are explanatory views showing steps of connecting the lateral insert type yoke to a shaft.

Referring to FIG. 2, a yoke 4 fixed by welding or a screw to a front side end of the shaft 5, shown on the right side in FIG. 2, such as a steering shaft etc, is connected via a cross shaft 6 to a yoke 1 joined to a shaft 3 shown on the left side in FIG. 2. Four pieces of side ends of the spider 6 are connected in a possible-of-rolling manner to front side ends of the yokes 1, 4 through needle bearings (not shown) provided within a bearing cup 6a.

The yoke 1 includes a connection portion 11, for connecting the shaft 3, provided at a side end opposite to the connecting side to the yoke 4. The shaft 3 is inserted into this connection portion 11 and fastened by the fastening bolt 2, thereby connecting the shaft 3 to the connection portion 11.

This connection portion 11 of the yoke 1 is, as shown in FIG. 1A, formed substantially in a U-shape (which appears to be an invert U-shape in FIG. 1A) in section within the plane orthogonal to an axial direction, of the shaft 3. The connection portion 11 is constructed of holding members 11a, 11b extending in parallel within the U-shape, and a curved portion 11c corresponding to a concave portion of the U-shape. The holding members 11a, 11b define an opening 11f formed at the side surface (the lower surface side in FIG. 1A) of the shaft 3. Bolt holes 11d, 11e are provided in the vicinities of the front side ends of the holding members 11a, 11b. A nut 7 formed with a screw hole 7a is fixedly fitted inside to one bolt hole 11d. The other bolt hole 11e has an inside diameter concentric with the nut 7 and slightly larger than an inside diameter of the bolt 11d.

The shaft 3 has a pair of flat surfaces 3a formed in parallel to each other along its outer peripheral surface at the front side end thereof. As shown in FIG. 1A, the shaft takes a sectional configuration suited to the concave of the U-shape.

On the other hand, the fastening bolt 2 (which will hereinafter be simply referred to as the bolt 2) penetrating the bolt holes 11d, 11e of the holding members 11a, 11b, includes a head 2a serving as a fastening portion, a screw portion 2c constructed of a portion formed with a screw and a proximal portion formed with no screw but having the same outside diameter R1 as the diameter of the screwed portion, and a large-diameter portion 2b defined as an intermediate portion between the screw portion 2c and the head 2a and having a diameter R2 slightly larger than the diameter R1 of the screw portion 2c R1 <R2 ). A side end, on the side of the screw portion 2c, of the large-diameter portion 2b is tapered toward its front end.

A washer 8 is, as shown in FIG. 1B, fitted externally to the fastening bolt 2 so as to be adjacent to the head 2a. A cam member 9 is likewise fitted externally to the bolt 2 so as to be adjacent to the washer 8. A recess 8a having a size suited to receiving an engagement portion 9c of the cam member 9, is formed in the surface, facing to the cam member 9, of the washer 8. An inside diameter of the washer 8 is set slightly larger than the outside diameter R2 of the large-diameter portion 2b of the bolt 2 so that the washer 8 is movable along the large-diameter portion 2b.

The cam member 9 has a cam portion 9a (see FIG. 8) formed decentered from the axial center of the bolt 2, and a bolt hole fitting portion 9b having a diameter suited to make a movable internal fitting into the bolt hole 11e. The cam member 9 further has the engagement portion 9c having and outside diameter larger than the inside diameter of the bolt hole 11e and engaging with the outer side surface of the holding member 11b. The cam member 9 is provided with a fitting hole 9d (see FIG. 1B) that fitted on the bolt 2. When this cam member 9 rotates, the cam portion 9a pushes the side surface of the shaft 3. As shown in FIG. 3, an inside diameter r of the fitting hole 9d (of which a position is indicated by a broken line in FIG. 3) of the cam member 9, is set slightly larger than the outside diameter R1 of the screw portion 2c of the bolt 2 (r>R1 ). The cam member 9 is movable in the axial direction on the screw portion 2c, however, the inside diameter r is set slightly smaller than the outside diameter R2 of the large-diameter portion 2b of the bolt 2 (r<R2 ), with the result that the large-diameter portion 2b is press-fitted into the fitting hole 9d of the cam member 9 with a frictional resisting force. The cam member 9 is therefore composed of a material exhibiting a predetermined elasticity enough to make this press-fitting attainable.

Further, the cam member 9 is, as shown in FIG. 4, formed with two notches 9f extending in the axial direction in a portion (indicated by an arrowhead B in FIG. 8) having a comparatively small thickness, and these notched portions are bent inwards, i.e., towards the bolt 2, thus providing a stopper member 9e this stopper member 9e functions as a stopper so that the front side end thereof is caught by a thread ridge of the bolt 2 and the cam member 9 does not come off the bolt 2.

Figure 5:
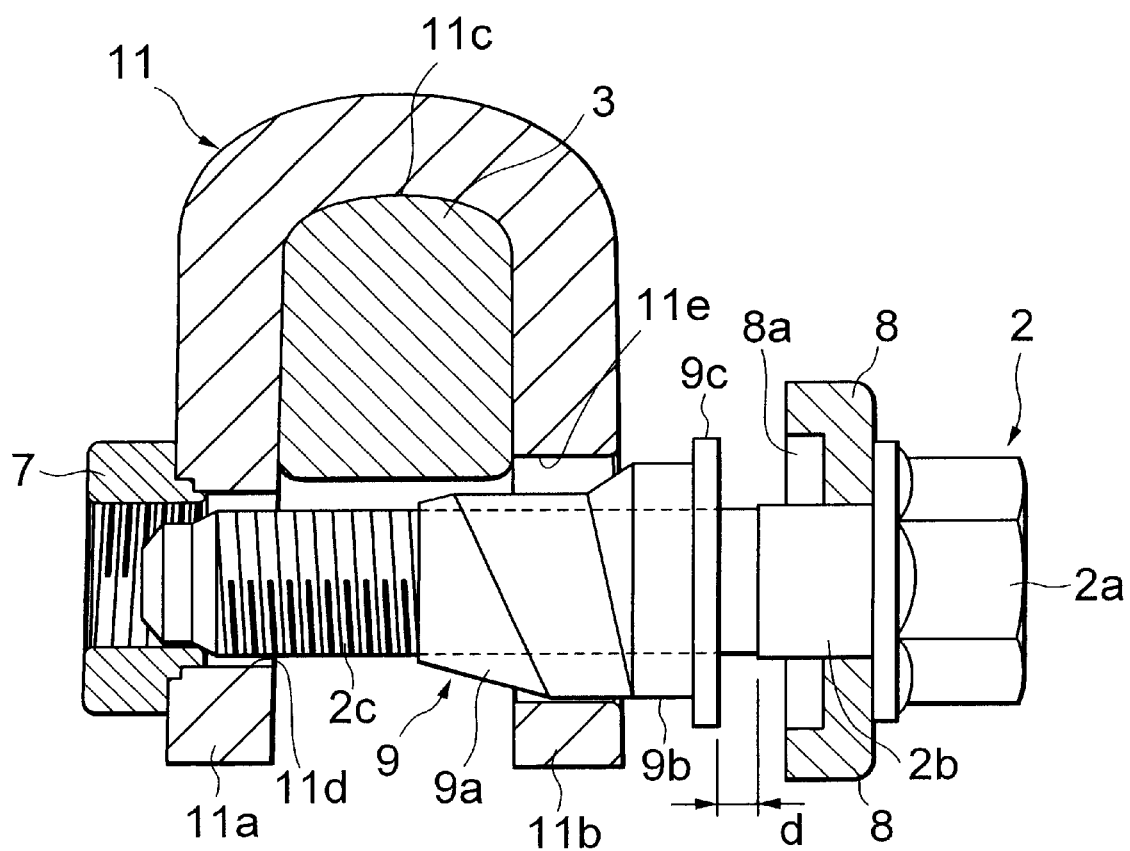
FIG. 5 is an explanatory view showing a step of connecting the lateral insert type yoke and the shaft.

Based on the construction described above, a step of inserting and fixing the shaft to the connection portion 11 of the yoke 1 will be explained with reference to FIGS. 5 through 7. As shown in FIG. 5, the shaft 3 is inserted sideways via the opening 11f into the curved portion 11c of the connection portion 11, and thereafter the bolt 2 fitted thereon with the washer 8 and the cam member 9 is inserted from outside (from the right side in FIG. 5) into the bolt hole 11e of the holding member 11b. Then, the front side end of the screw portion 2c of the bolt 2 comes into contact with the screw hole 7a of the nut 7 via the other bolt hole 11d. At this time, as shown in FIG. 5, the thinner portion (indicated by the arrowhead B in FIG. 8) of the cam member 9 is brought into contact with the side surface of the shaft 2 or stops in the illustrated position in a non-contact state. In fact, the position of the shaft 2 is not fixed when inserting the shaft 2, and hence the cam member 9, if kept contact with the side surface of the shaft 2, halts in this position by a frictional resisting force thereof. Simultaneously with this, the large-diameter portion 2b of the bolt 2 does not yet arrive at (does not come into contact with) the opening edge of the fitting hole 9d, on the side of the washer 8, of the cam member 9, and there is a spacing d so far. Then, the screw member 2 is movable with respect to the fitting hole 9d, and hence no load is applied on the rotation of the bolt 2. Accordingly, the bolt is rotated by pinching the head 2a with fingers, and the front side end thereof can be well screwed twice or three times into the screw hole of the nut 7.

Figure 6:
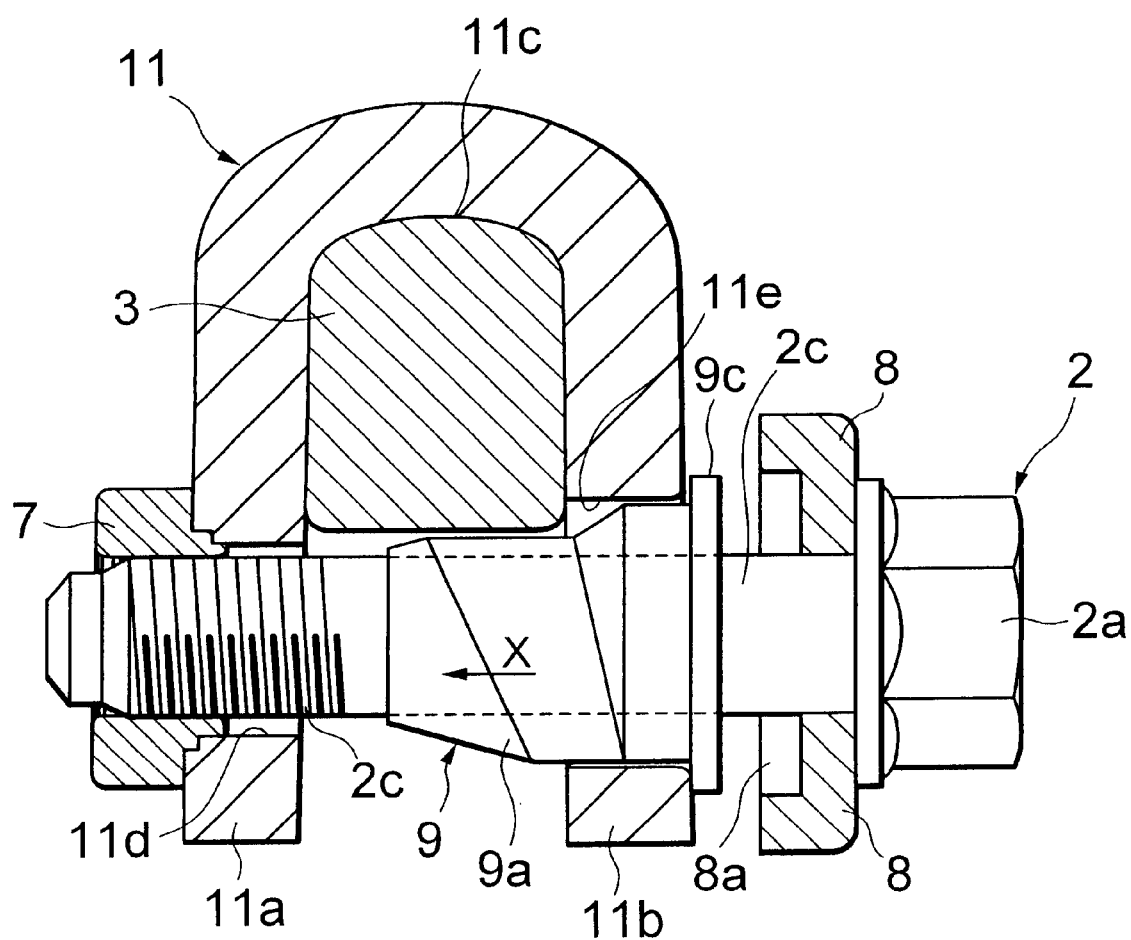
FIG. 6 is an explanatory view showing a step of connecting the lateral insert type yoke and the shaft.
Figure 7:
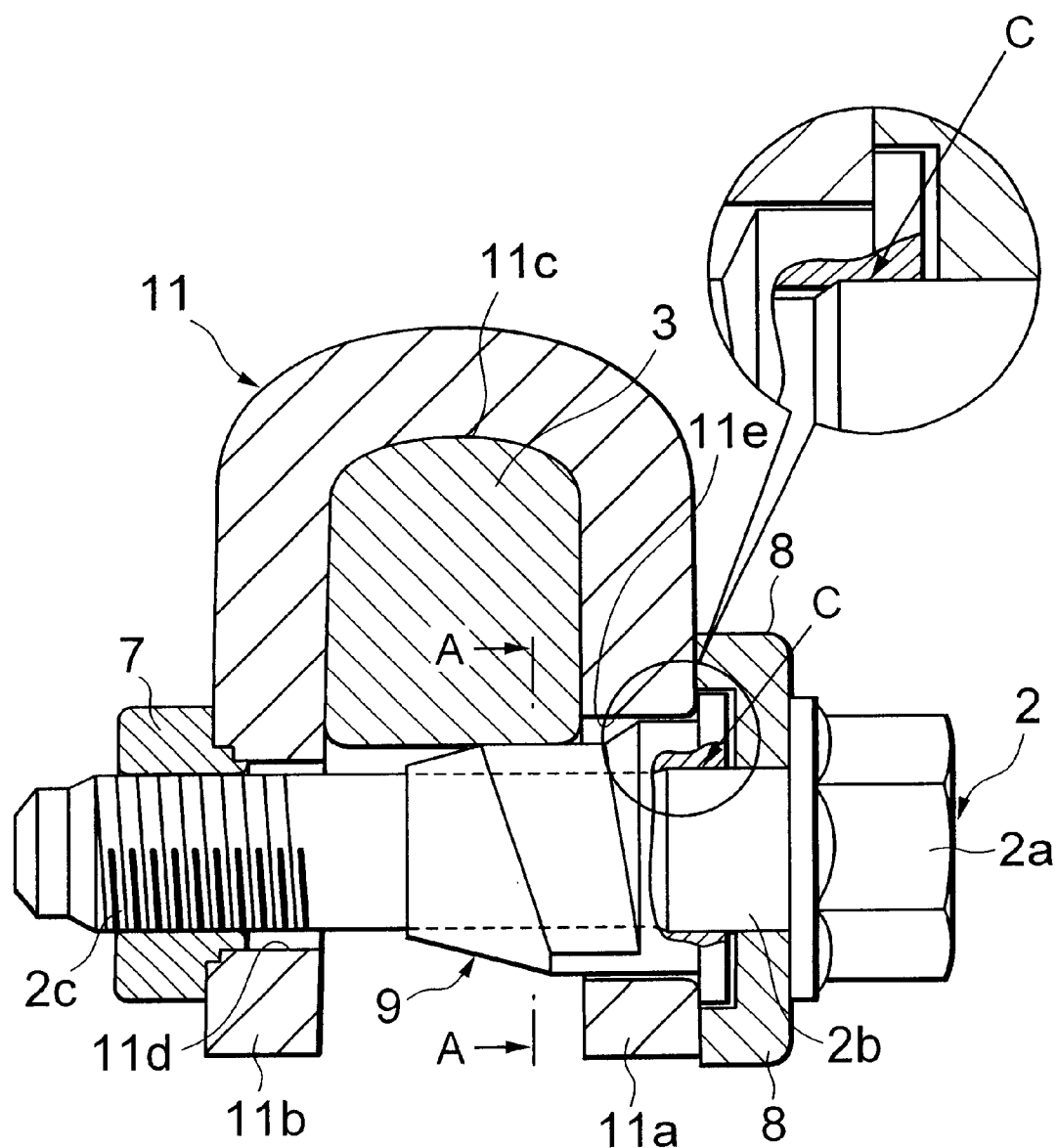
FIG. 7 is an explanatory view showing a step of connecting the lateral insert type yoke and the shaft.

When the bolt 2 continued to be thus rotated by the fingers, as shown in FIG. 6, the large-diameter portion 2b of the bolt 2 enters the fitting hole 9d of the cam member 9 and impinges on the opening edge thereof, and the large-diameter portion 2b pushes the cam member 9, with the result that the cam member 9 moves together with the screw portion 2c in an arrow direction A. At this time, if the cam member 9 is kept contact with the side surface (the lower surface side in FIG. 6) of the shaft 2, the frictional resisting force is generated, and the load is applied on the X-directional movement of the cam member 9. Therefore, a tool is needed for rotating the bolt. Then, the engagement portion 9c of the cam member 9 engages with the outer side surface of the holding member 11b, whereby the X-directional movement of the cam member 9 stops.

Even when trying to further rotate the bolt 2 by pinching the head 2a with the fingers from the state where the engagement portion 9c of the cam member 9 engages therewith, the large-diameter portion 2b moves to forcibly enter the fitting hole 9d because of the outside diameter of the large-diameter portion 2b of the bolt being larger than the inside diameter of the cam member 9, and therefore the bolt 2 can not be rotated due to a large load generated by the frictional resisting force. Such being the case, when the bolt 2 is rotated and fastened by use of a tool such as an impact trench etc, because of the front side end of the large-diameter portion 2b being tapered, as indicated by an arrowhead c in FIG. 7, the large-diameter portion 2b is press-fitted deep into the fitting hole 9d, with the result that the cam member 9 is, as shown also in FIG. 8, rotated in an arrow direction D with the rotations of the bolt 2. With the rotations of the cam member 9, the side surface of the shaft 3 is pushed up and pressed against the curved portion 3c with no spacing, and centering (positioning at the axial center) is thus carried out.

At this time, when the shaft 3 is pushed up to the limit by the pressing of the cam portion 9a, the cam portion 9a stops rotating there, and thereafter only the bolt 2 rotates resisting the frictional resisting force. Thus, the bolt 2 is further rotated, and, as shown in FIG. 7, the recess 8a f the washer 8 is eventually fitted to the engagement portion 9c of the cam member 9. At the same time, the bolt 2 is screwed deep till the washer 8 impinges on the outer side surface of the holding member 11b, thereby completing the fixation of the shaft 3 to the yoke 1.

Accordingly, the screw portion 2c of the bolt 2 must have at least a length enough to prevent the press-fitting even when the large-diameter portion 2b comes into contact with the fitting hole 9d till the front side end of the screw portion 2c is at first screwed into the nut 7. Besides, a relative degree of the outside diameter R2 of the large-diameter portion 2b of the bolt 2 to a axial length thereof, and a relative degree of the inside diameter r of the fitting hole 9d of the cam member 9 to its length, must be set to degrees enough to generate a frictional resisting force to such an extent that the centering of the shaft 3 can be attained by press-fitting the large-diameter portion 2b into the fitting hole 9d and rotating the cam member 9. For example, if both of the outside diameter R2 and the length of the large-diameter portion 2b are small, there is not caused the frictional resisting force for pushing up the shaft 3 to such a degree that the centering can be done, and only the bolt 2 is rotated and screwed in.

Figure 8:
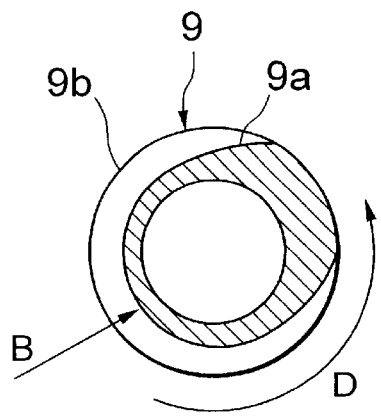
FIG. 8 is a sectional view taken along the line A—A in FIG. 7.

Further, when the cam member 9 is intruded along the side surface of the shaft 3 without rotating, as shown in FIG. 8, the cam member 9 be, it is preferable, positioned with respect to the bolt 2 so that a portion (indicated by the arrowhead B), having a minimum operation quantity, of the cam portion 9a, in other words, the portion provided with the stopper portion 9e is positioned facing to the side surface of the shaft 3. For instance, referring to FIG. 5, it is ideal that the bolt 2 be screwed with the cam member 9 being externally fitted so that the stopper portion 9e thereof is disposed upwards.

Note that the cam member 9 rotates with the rotations of the bolt 2, the cam portion 9a pushes up the shaft 3 to the limit, and, after the rotations of the cam portion 9a have stopped, only the bolt 2 rotates, at which time the large-diameter portion 2b of the bolt 2 must rotate resisting a high pressure (the frictional resisting force) of the fitting hole 9d having the smaller inside diameter, and hence a larger force is needed for screwing the bolt 2 in.

Thus, when the bolt 2 is at first screwed into the nut with the fingers, the cam member 9 does not yet come into contact with the large-diameter portion 2b, so that the bolt 2 can be easily screwed in by rotating the head 2a with the fingers without any load being applied on the rotations of the bolt 2. Thereafter, when the bolt 2 is further screwed in, the large-diameter portion 2b is press-fitted by the high pressure into the fitting hole 9d of the cam member 9. Hence, the cam portion 2a of the cam member 9 rotates with the rotations of the bolt 2 to push the shaft 3 up to the curved portion 11c, thus performing the centering of the shaft 3.

Figure 9:
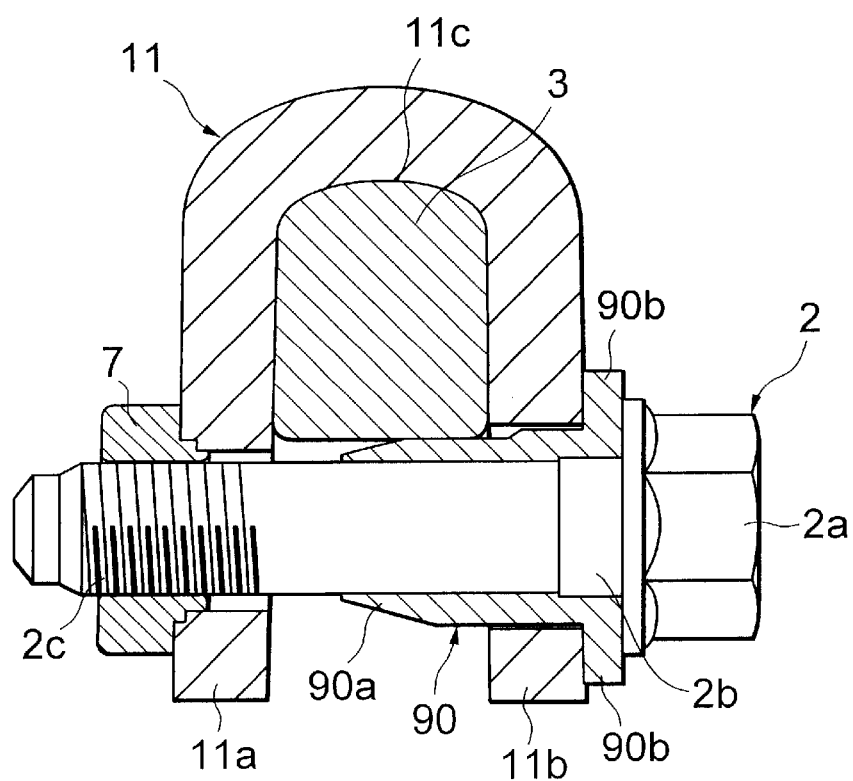
FIG. 9 is a sectional view showing configurations of the lateral insert type yoke and the fastening bolt in a second embodiment of the present invention.

Next, other embodiments will be explained with reference to the FIGS. 9 through 11. A second embodiment illustrated in FIG. 9 is substantially the same as the first embodiment discussed above, and the same members are marked with the same numerals. A different point is that a cam member 90 is provided with a washer portion 90b incorporating the functions of the engagement portion 9c and the washer 8 (see FIG. 1) in the first embodiment, and the separate washer 8 is eliminated. Accordingly, this cam member 90 is constructed of a cam portion 90a and the washer portion 90b and composed of a metal.

In this construction, the washer portion 90b engages with the outer side surface of the holding member 11b, and the bolt 2 is screwed in till the head 2a impinges on an outer side surface (a right side end surface in FIG. 9) of the washer portion 90b. Other steps of fixing the shaft 3 to the joint portion 11 with the bolt 2 by fastening it, are the same as those in the first embodiment, and hence their repetitive explanations are omitted.

Figure 10:
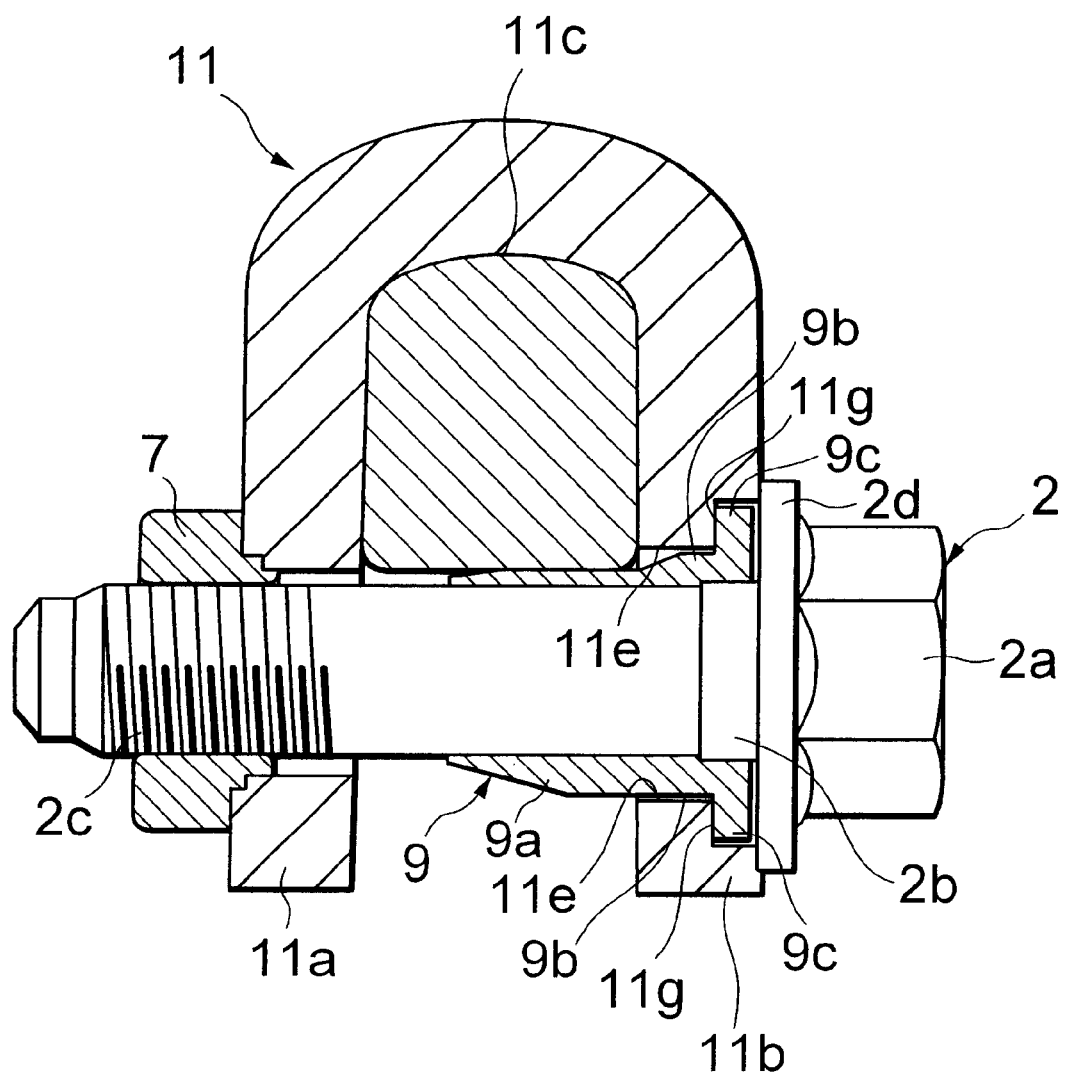
FIG. 10 is a sectional view showing configurations of the lateral insert type yoke and the fastening bolt in a third embodiment of the present invention.

A third embodiment illustrated in FIG. 10 is substantially the same as the first embodiment, and the same members are marked with the same numerals. A different point is that the outer side surface of the holding member 11b is formed with a counterbore 11g having a size suited to fitting of the engagement portion 9c (see FIG. 1) of the cam member 9, the washer portion 2d is provided integrally with the head 2a on the side of the large-diameter portion 2b of the head 2a f the bolt 2, and the washer 8 (see FIG. 1) is eliminated.

In this configuration, the engagement portion 9c of the cam member 9 is fitted into the counterbore 11g and thus engages therewith, and the bolt 2 is screwed in till the washer portion 2d impinges on the outer side surface (the right side end surface in FIG. 10). Other steps of fixing the shaft 3 to the joint portion 11 with the bolt 2 by fastening it, are the same as those in the first embodiment, and hence their repetitive explanations are omitted.

Figure 11:
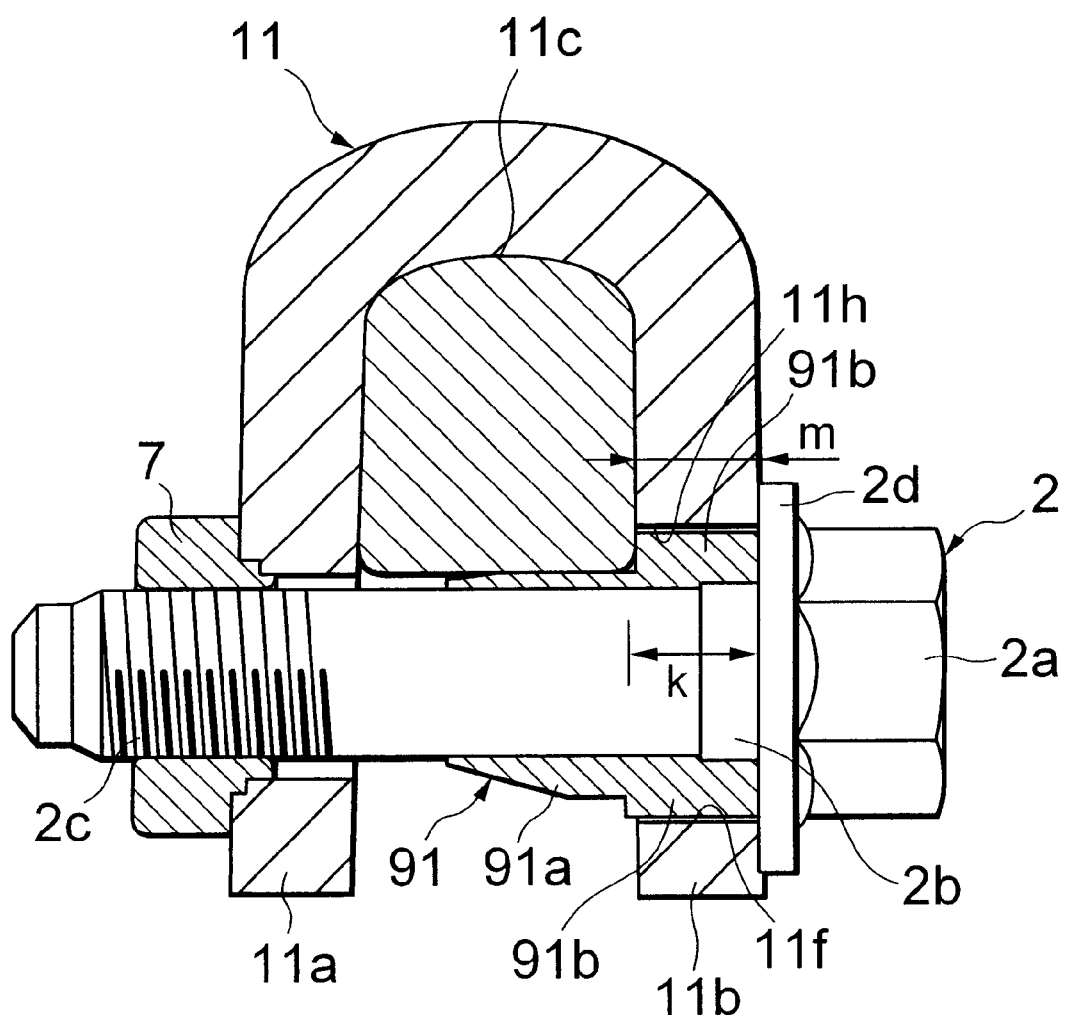
FIG. 11 is a sectional view showing configurations of the lateral insert type yoke and the fastening bolt in a fourth embodiment of the present invention.

A fourth embodiment illustrated in FIG. 11 is substantially the same as the first embodiment, and the same members are marked with the same numerals. A different point is that the engagement portion 9c of the cam member 9 is eliminated, a bolt hole fitting portion 91b having an outer diameter slightly smaller than the engagement portion 9c and slightly larger than the outside diameter of the bolt hole fitting portion 9b, is provided as a substitute in the cam member 91, and an inside diameter of a bolt hole 11h is set slightly larger than the inside diameter of the bolt hole 11e (see FIG. 1). The cam member 91 is constructed of the cam member 91a and the bolt hole fitting portion 91b. A width k of the bolt hole fitting portion 91b is, however, set the same as a width m, in the axial direction of the bolt, of the holding member 11b (k=m).

In this configuration, when the bolt 2 is screwed in till the bolt hole fitting portion 91b is fitted into the bolt hole 11h, the edge of the front side end (the 10 left side end in FIG. 11) impinges on the opposite surface of the shaft 3 and therefore stops there. The bolt 2 is thereafter screwed in till the washer portion 2d impinges on the outer side surface (the left side end surface in FIG. 11) of the holding member 11b. Other steps of fixing the shaft 3 to the connection portion 11 with the bolt 2 by fastening it, are the same as those in the first embodiment, and hence their repetitive explanations are omitted.

As discussed above, according to the first through fourth embodiments, the cam member is movable in the axial direction of the bolt at the bolt portion facing to at least a part of the shaft inserted in between the holding members of the yoke. When the front side end of the crew portion of the bolt is brought into contact with the screw hole, the cam member is movable on the bolt, and hence the bolt can be at first easily screwed in twice or three times by pinching the head thereof with the fingers. At the same time, the bolt is provided with the frictional engagement portion for rotating the cam member by frictionally engaging with the cam member when fastening the bolt screwed into the screw hole, and the centering of the shaft can be attained with the rotations of the cam member by thereafter fastening the bolt screwed therein.

Thus, according to the first through fourth embodiments, when the front side end of the screw portion of the bolt is at first screwed into the screw hole of the holding member, the cam member is still movable on the bolt in the axial direction of the bolt, so that the bolt can be lightly screwed in twice or three times by pinching the head with the fingers. Thereafter, when the bolt is further screwed and fastened by using the tool, the frictional engagement portion of the bolt frictionally engages with the cam member, thereby generating the frictional resisting force. With this frictional resisting force, the cam member rotates with the rotations of the bolt, and the cam member intrudes the shaft into the recessed portion of the U-shaped holding members, thus performing the centering. Accordingly, the bolt can be inserted through the bolt hole provided on the nearer side and fastened as it is, whereby the operation of connecting the shaft to the universal joint can be facilitated, and a certainty and reliability of the operation can be enhanced.

Figure 13:
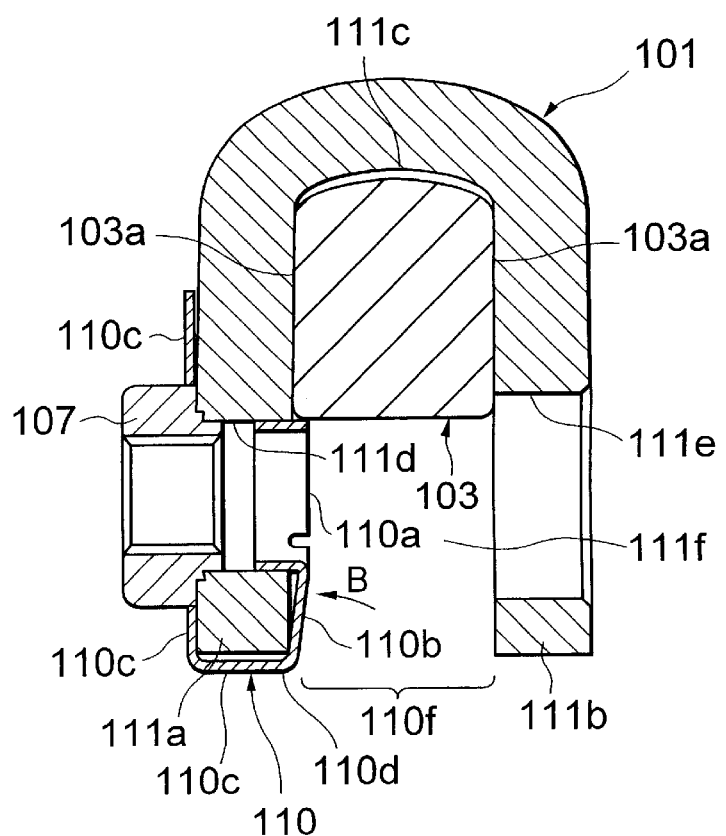
FIG. 13 is a side sectional view showing a configuration in a state where the temporary holding clip is attached to the lateral insert type yoke in FIGS. 12A and 12B.
Figure 14:
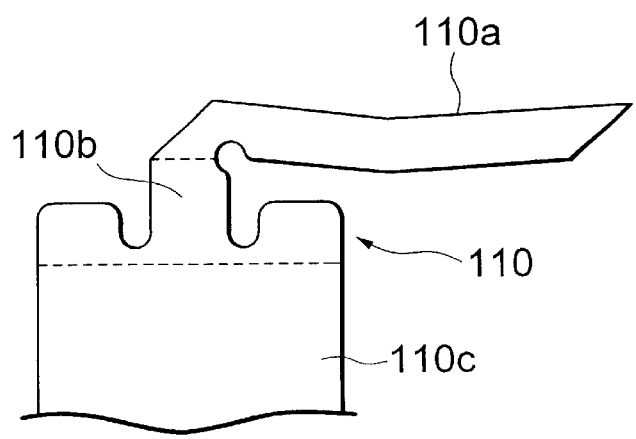
FIG. 14 is a development view showing an engagement portion and a support portion of the temporary holding clip.
Figure 22:
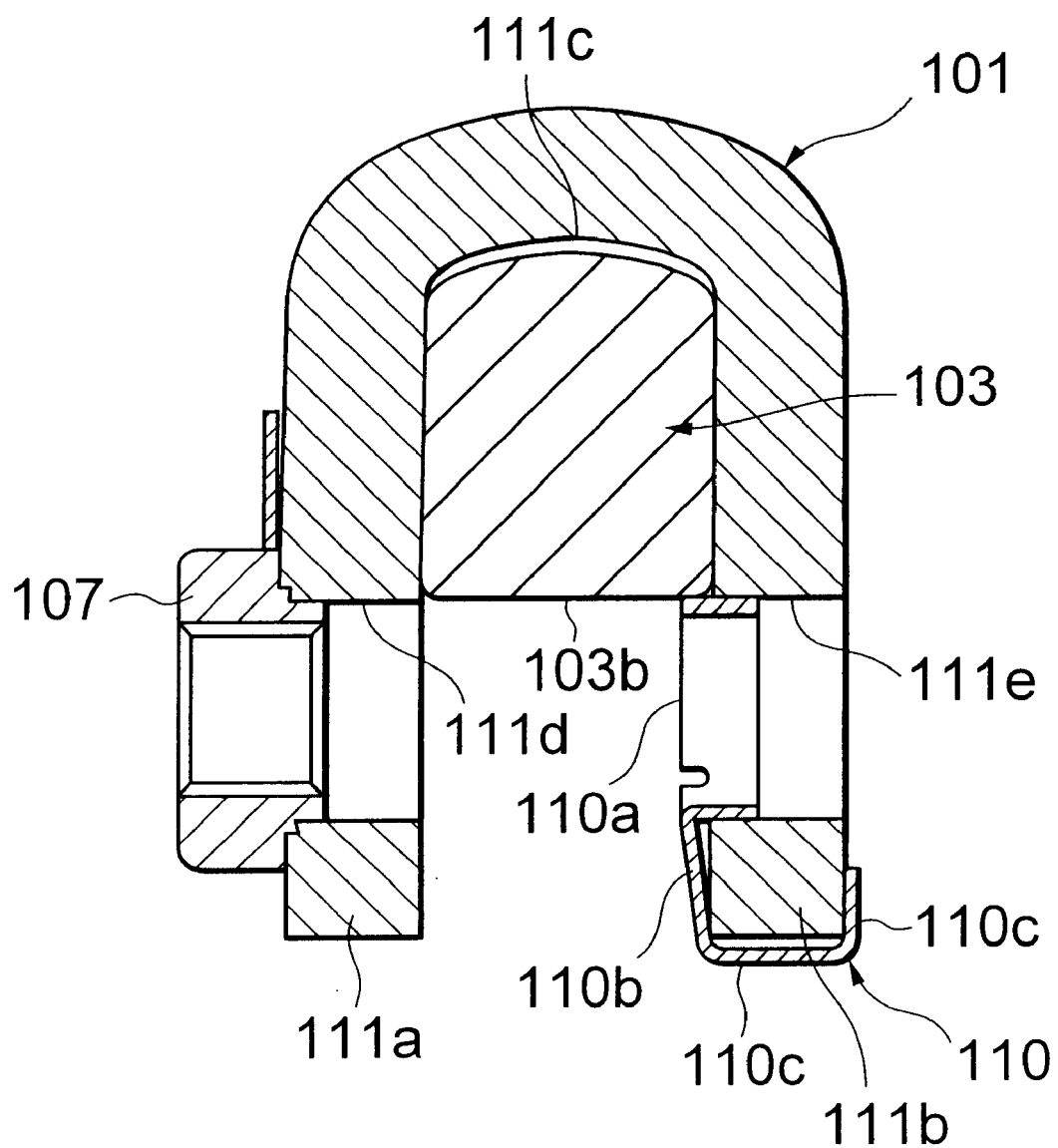
FIG. 22 is a side sectional view showing the lateral insert type yoke and the shaft temporary holding clip in a sixth embodiment of the present invention.
Figure 23:
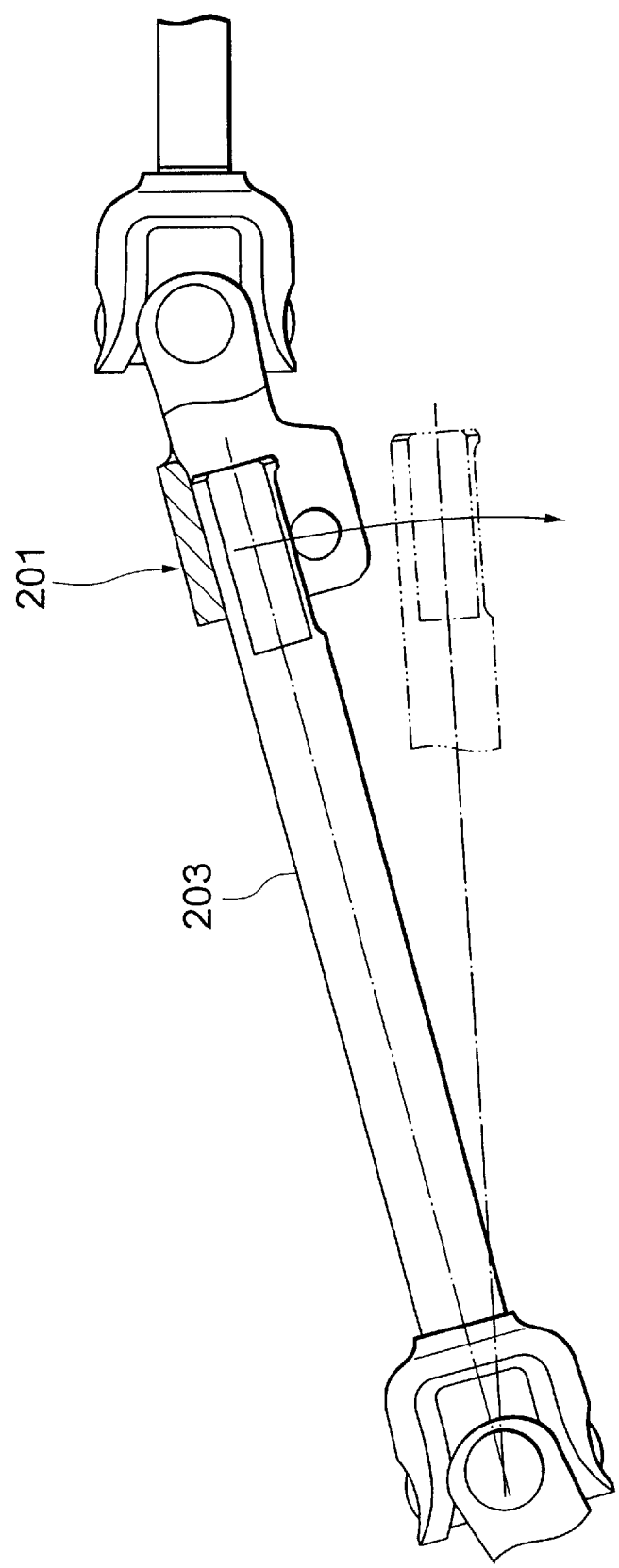
FIG. 23 is an explanatory view showing a deviation of the shaft from the yoke in the prior art.
Figure 24:
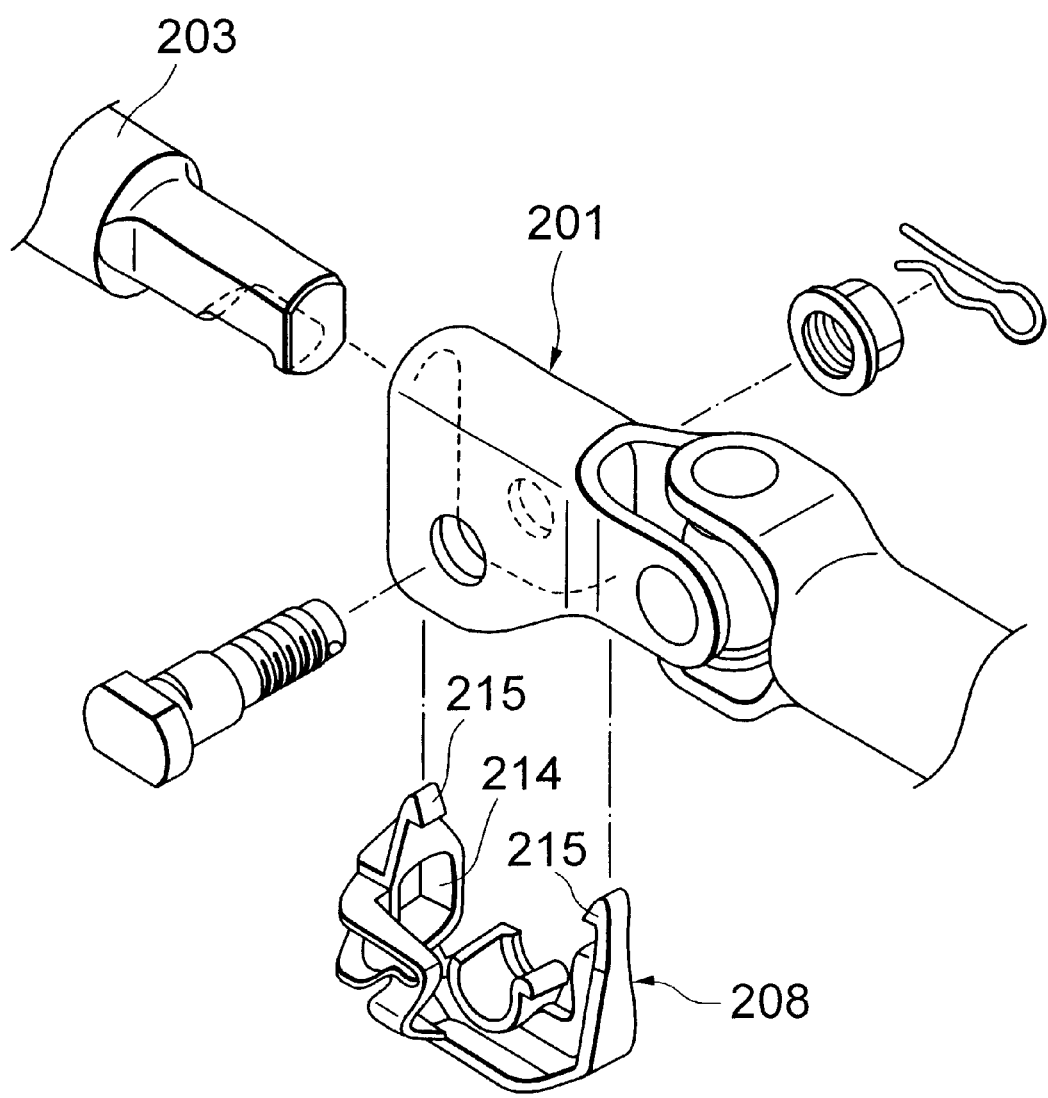
FIG. 24 is a perspective exploded view showing the lateral insert type yoke and the temporary holding clip in the prior art.
Figure 25:
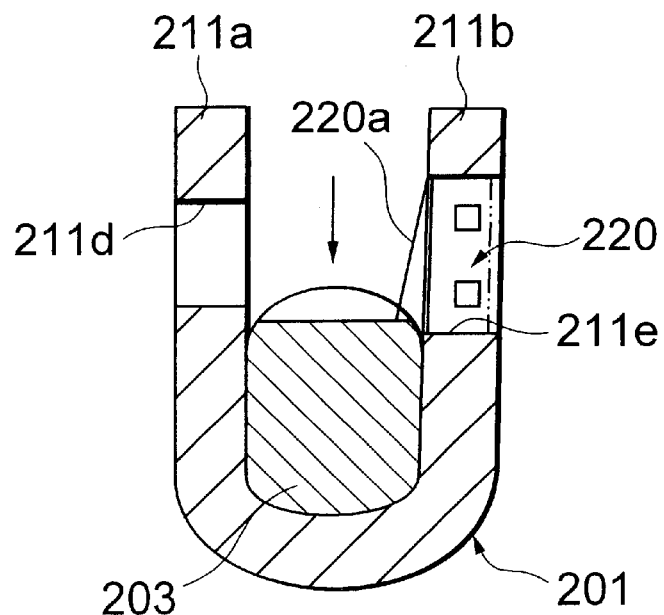
FIG. 25 is a side sectional view showing a configuration of the yoke fitted with the temporary holding clip in the prior art.
Figure 26:
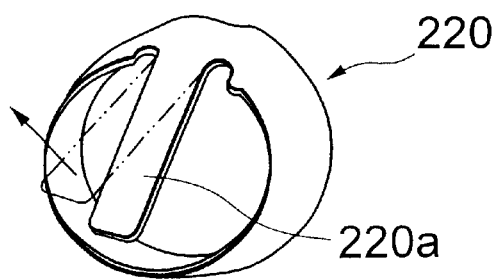
FIG. 26 is a perspective view showing the temporary holding clip in the prior art.
Figure 27:
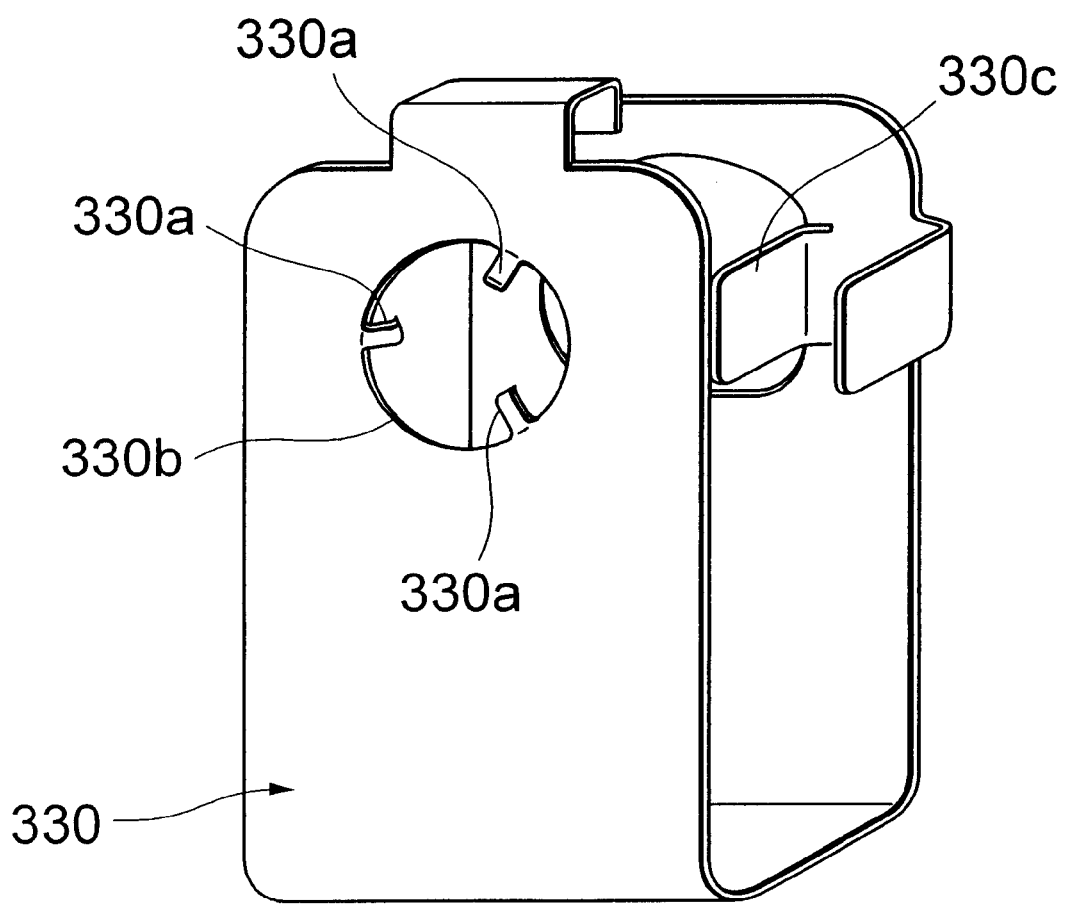
FIG. 27 is a perspective view showing the temporary holding clip in the prior art.

FIG. 12A is a front view showing a shaft temporary holding clip of the lateral insert type yoke in a fifth embodiment of the present invention. FIG. 12B is a sectional view taken along the line A—A in FIG. 12A. FIG. 13 is a side sectional view showing a state where the temporary holding clip is attached to the lateral insert type yoke. FIG. 14 is a partial development view showing the temporary holding clip. FIGS. 15A–15C and 16A–16C are views each similar to FIG. 12A, 12B, showing first and second modifications of the fifth embodiment. FIG. 17 is a partial development view showing the second modification. FIGS. 18A, 18B through 21A, 21B are side sectional views each showing an operation of the temporary holding clip, and partial sectional views as viewed from the front. FIG. 22 is a side sectional view showing the lateral insert type yoke and the shaft temporary holding clip in a sixth embodiment of the present invention.

Referring to FIGS. 12A and 12B, a shaft temporary holding clip 110 (which will hereinafter be referred to as the clip 110) according to the fifth embodiment of the present invention, includes an engagement portion 101a taking a cylindrical shape, a rectangular support portion 110b for supporting at its one side end this engagement portion 110a, and a fitting portion 110c (see FIG. 12B) bent in an L-shape, extending in continuity to the other side end of the support portion 110b, and having a nut fitting hole 110e. These components are integrally formed by their being punched out of one metal sheet exhibiting an elasticity.

FIG. 13 shows a state where this clip 110 is fitted to the lateral insert type yoke. A portion of the yoke 101 at which to connect the shaft 102 is formed substantially in a U-shape (which appears to be an invert U-shape in FIG. 13) in section within the plane orthogonal to the axial direction of the shaft 103. The yoke 101 is constructed of holding members 111a, 111*b* extending in parallel within the U-shape, and a curved portion 111*c* corresponding to the concave of the U-shape. The holding members 111*a*, 111*b* define an opening 111*f* formed at the side surface (the lower surface side in FIG. 13) of the shaft 103. A nut hole hid is formed in the vicinity of the front side end of the holding member 111*a*. A bolt hole 111*e* is formed in the vicinity of the front side end of the holding member 111*b*. A nut 107 formed with a screw hole is internally fixedly fitted in the nut hole 111*d*. The bolt hole 11*e* is concentric with the nut 107 and has an inside diameter slightly larger than an inside diameter of the nut hole 111*d*.

The shaft 103 has a pair of flat surfaces 103*a* formed in parallel to each other along its outer peripheral surface at the front side end thereof. As shown in FIG. 13, the shaft takes a sectional configuration as shown in FIG. 13.

The fitting portion 110*c* of the clip 110 is fitted on the nut 107 so that the nut fitting hole 110*e* is fitted on the nut 107 and so as to be fitted on the side end of the holding member 111*a* inwards from outside with no gap along its configuration.

The support portion 110*b* is, as shown also in FIG. 12B, so formed as to protrude from an internal side end portion 110*d* of the fitting portion 110*c* in a direction more inclined inward by a predetermined angle α than in a direction orthogonal to the axial direction of the bolt. The support portion 110*b* can be, as shown in FIG. 13, bent in an outside direction (in an arrowhead direction B) with the internal side end portion 110*d* serving as a fulcrum till the support portion 110*b* comes into contact with an inside surface of the holding member 11*a*. A bending range thereof is, however, within a limit of elasticity, and the support portion 110*b* is constructed to, when a force applied is removed, elastically return to its original position.

The cylindrical engagement portion 110*a* is formed by bending, in a cylindrical shape a metal sheet cut in a configuration as shown in FIG. 14. The engagement portion 110*a* is formed integrally with the front side end of the support portion 110*b*, and the engagement portion 110*a* is so disposed movably in the axial direction of the bolt as to be fitted in the nut hole 111*d*. When no force is exerted on the support portion 110*b*, at least a half of the cylindrical portion of the engagement portion 110*a* is kept fitted in the nut hole 111*d*. Then, the engagement portion 110*a* engages at its upper side end in FIG. 13 with the shaft 103 inserted in the curved portion 111*c* of the yoke 101, thereby supporting (temporarily holding) the shaft 103 so as not come off the yoke 101.

It is required that an outside diameter of this engagement portion 110*a* be set slightly smaller than the inside diameter of the nut hole 111*d* to such an extent that the engagement portion 110*a* is movable in the axial direction of the bolt when fitted into the nut hole 111*d*. It is therefore necessary that a length of the support portion 110*b* in a longitudinal direction be set so such a dimension that the engagement portion 110*a* is smoothly movable within the nut hole 111*d*. Further, an inside diameter of the engagement portion 110*a* is required to be set slightly larger than the outside diameter of the bolt to such a degree as not to interfere with fastening the unillustrated bolt.

Note that the concave portion configured by the fitting portion 110*c* and the support portion 110*b* of the clip 110 is required to set to such a dimension and configuration as to fit on the front side end of the holding member 111*a* of the yoke 101 with no gap therebetween.

Moreover, the fitting portion 110*c* of the clip 110 may be, because of the engagement portion 110*a* being as shown in FIG. 13 caught inside by the nut hole 111*d*, set to such a length as to get contact with the lower side end of the nut 107 in FIG. 13 by cutting a portion including the nut fitting hole 110*e*. The fitting portion 110*c* may thus take a simpler configuration. The configuration having the nut fitting hole 110*e* is, however, more certain of fitness and preferable.

As discussed above, the engagement portion 110*a* takes the cylindrical shape in the fifth embodiment, however, the configuration of the engagement portion is not limited to the cylindrical shape. FIGS. 15A–15C and 16A–16C, respectively show first and second modifications of the fifth embodiment.

Figure 15A:
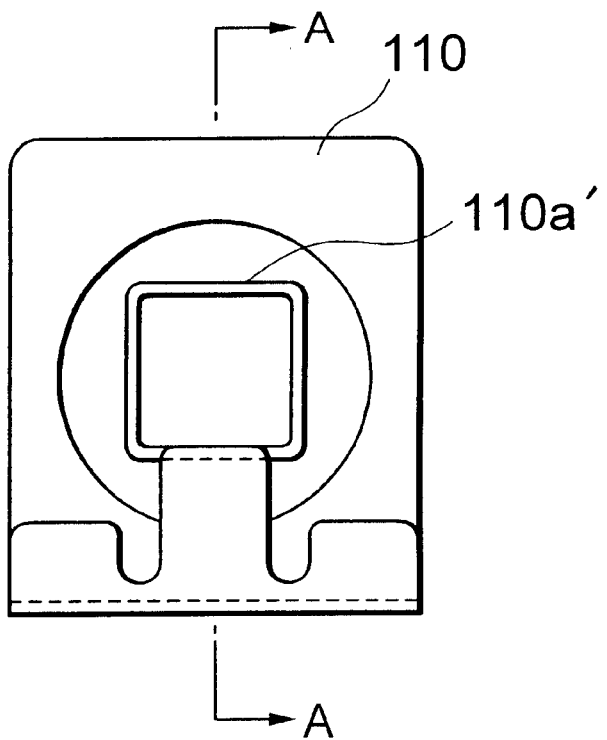
FIG. 15A is a front view showing the temporary holding clip in a first modification of the fifth embodiment of the present invention.
Figure 15B:
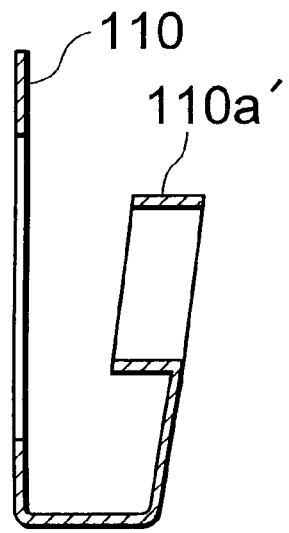
FIG. 15B is a sectional view taken along the line A—A in FIG. 15A.
Figure 15C:
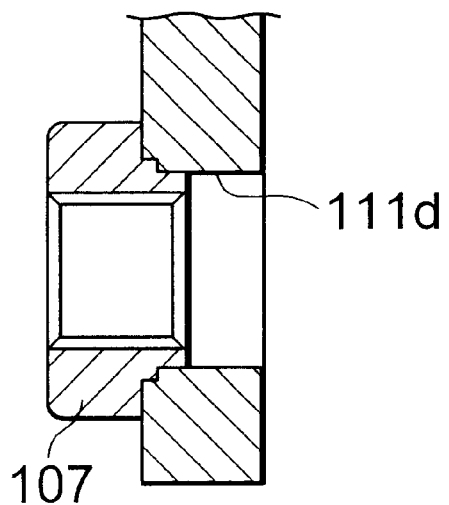
FIG. 15C is a partial sectional view showing a state where a nut is attached to the lateral insert type yoke.

In the first modification shown in FIGS. 15A–15C, an engagement portion 110*a'* of the clip 110 is formed in a square cylindrical shape in place of the cylindrical shape. Configurations of other portions of the clip 110 are the same as those in FIGS. 12A and 12B. Note that the nut hole 111*d* of the yoke 101 may preferably be formed as a square hole in the first modification.

Figure 16A:
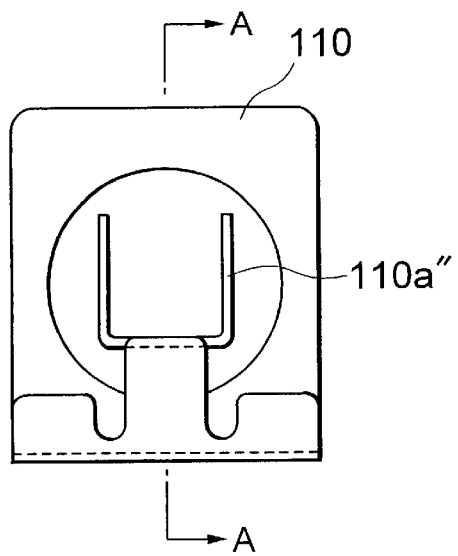
FIG. 16A is a front view showing the temporary holding clip in a second modification of the fifth embodiment of the present invention.
Figure 16B:
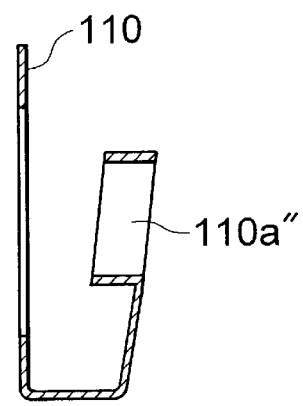
FIG. 16B is a sectional view taken along the line A—A in FIG. 16A.
Figure 16C:
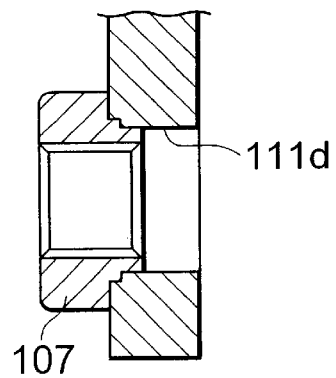
FIG. 16C is a partial sectional view showing a state where the nut is attached to the lateral insert type yoke.
Figure 17:
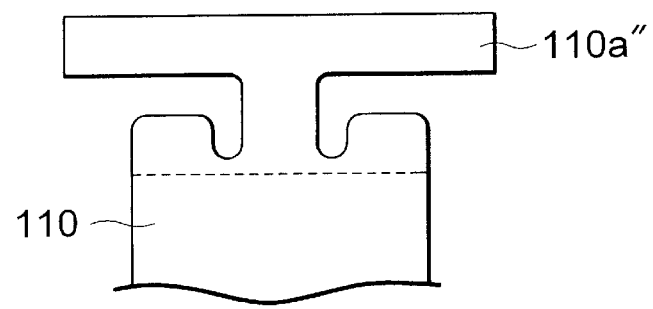
FIG. 17 is a development view showing the support portion and the engagement portion in the second modification.

FIGS. 16A–16C show the second modification of the fifth embodiment. In the second modification, a holding portion 110*a''* of the clip 110 is formed substantially in a U-shape open upwards. The holding portion 110*a''* in the second modification may be formed by bending substantially in the U-shape a metal sheet cut in a developed configuration as shown in FIG. 17. The holding portion 110*a'*, of which the developed configuration is simple is easy to be worked and can be manufactured at a low cost. In the second modification also, the nut hole lid of the yoke 101 may preferably be formed as a square hole.

Both of the first and second modifications have the same constructions other than the above as those shown in FIGS. 12A and 12B.

Next, an operation of inserting the shaft 103 into the yoke 101 fitted with the clip 110 will be described referring to FIGS. 18 through 21. The expression of the [upward, downward, leftward and rightward] directions is effective in only the reference drawings.

Figure 19B:
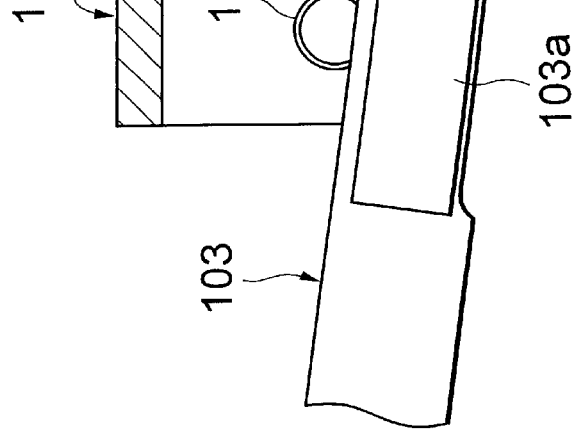
FIGS. 19A and 19B are a side sectional view showing a configuration in a state where the shaft starts being inserted into the yoke, and a sectional view showing a front part thereof.
Figure 19A:
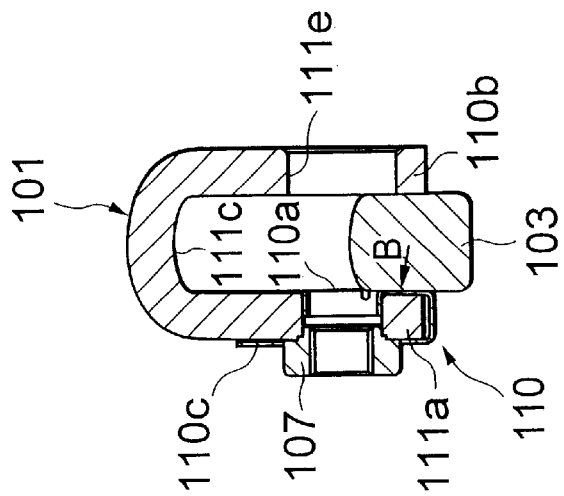

As illustrated in FIG. 18, when the shaft 103 is not yet inserted into the yoke 101, substantially a half of the engagement portion 110*a*, as in the state shown in FIG. 13, becomes protruded more inwards than the internal side surface of the holding portion 111*a* while being internally fitted to the nut hole 111*d*. Next, as shown in FIGS. 19A and 19B, when the shaft 103 starts being inserted from an opening 111*f* of the holding portion 111*a*, a front side end of the flat surface 103*a* disposed left side of the shaft 103 impinges on the support portion 110*b* inclined to the internal side surface of the holding portion 111*a*, but is slid as it is while further pushing the shaft 103. At this time, the support portion 110*b* is elastically pushed bent in an arrow direction B, and the engagement portion 110*a* moves back into the nut hole 111*d*, whereby the support portion 110*b* is brought into contact with the internal side surface of the holding portion 111*a* and becomes parallel therewith. This therefore results in permitting the shaft 103 to pass through. Then, as shown in FIGS. 20A and 29B, the shaft 103 is intruded as it is deep into the curved portion 111*c* of the yoke 101.

Then, as illustrated in FIGS. 21A and 21B, when the shaft 103 is intruded up to the curved portion 111*c*, a lower side surface 103*b* of the shaft 103 is positioned more upwards than the upper side end of the engagement portion 110*a*, and hence a pressing force of the shaft 103 upon the engagement portion 110*a* disappears, with the result that the engagement portion 110*a* is returned in an arrow direction C to its original position by dint of an elastic force of the support portion 110b. Accordingly, the upper side end of the engagement portion 110a is positioned under the lower side surface 103b of the shaft 103 and comes into contact therewith, whereby the shaft 103 is engaged (temporarily held) so as not to come off downwards.

Thereafter, the unillustrated bolt is inserted from the bolt hole 111e, and the engagement portion 110a is let through it and screwed in the screw hole of the nut 7. The inside diameter of the engagement portion 110a is, however, set slightly larger than the outside diameter of the bolt, and hence, when fastening the bolt, the fastening operation can be easily carried out without any interference of the bolt with the engagement portion 110a.

Figure 28:
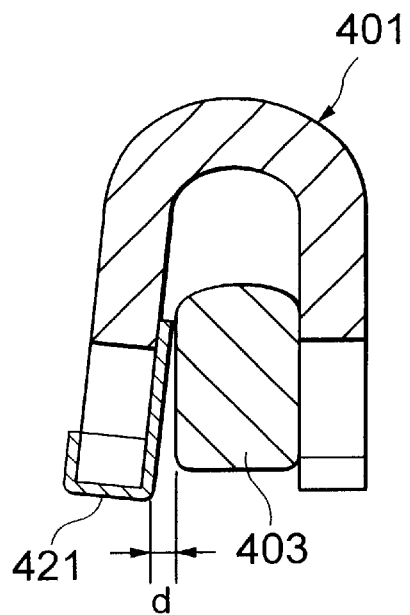
FIG. 28 is an explanatory view showing a state where the temporary holding clip is fitted to the yoke in the prior art.

In the yoke 101 fitted with the clip 110 having the construction described above, the nut 107 is fixed inside to the nut hole 111d and does not therefore come off when pushed by the bolt, and there is no necessity of manufacturing a rotation stopper. The clip 110 can be formed by the punch-out from the single metal sheet with the simple configuration. This working is easy, and the clip 110 can be manufactured at the low cost. Further, when the shaft 103 is inserted into the yoke 101, the engagement portion 110a enters the nut hole 111d, and therefore, the gap formed, as shown in FIG. 28, between the shaft 103 and the clip 110 may be small.

Figure 29:
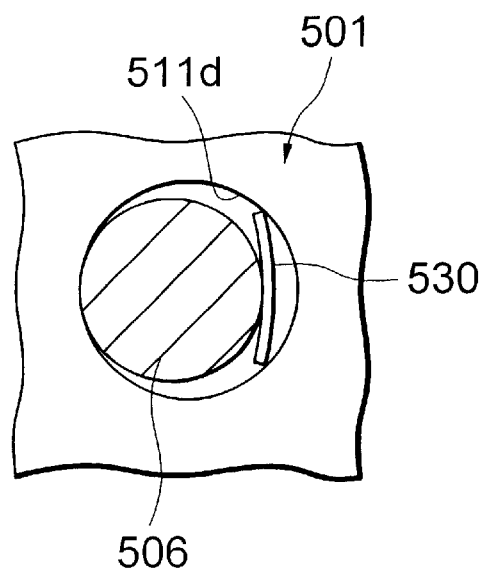
FIG. 29 is an explanatory view showing a state where a part of the temporary holding clip is inserted into a nut hole of the yoke in the prior art.

Then, unlike the prior art, there is not step of fitting the clip 110 to the shaft 103 and thereafter inserting the shaft 103 into the yoke 101. The shaft 103 can be inserted directly into the yoke 101 fitted with the clip 110. Further, unlike the prior art, neither the bolt interferes with the clip 110 when inserting the bolt, nor the engagement portion 110a is required to be positioned because of being cylindrical in its shape. Moreover, as shown in FIG. 29, it is unnecessary to increase a size of the nut hole 111d, and the clip 110 is not held in between the bolt and the yoke 101 when fastening the bolt. This therefore does not cause any slackening of the bolt. Next, a sixth embodiment will be discussed with reference to the FIG. 22.

The sixth embodiment illustrated in FIG. 22 is substantially the same as the fifth embodiment, and the same members are marked with the same numerals. A different point is that the clip 110 is attached to the holding portion 111b having the bolt hole 111e. In this case, as in the case of the nut hole 111d in the fifth embodiment, the bolt hole 111e is required to be set so that at least a side end (an upper end in FIG. 22) of the curved portion 111c of the bolt hole 111e is disposed closer (more downward in FIG. 22) to the opening 111f than the side surface 103b, on the side of the opening 111f, of the shaft 103, i.e., the engagement portion 110a is brought into contact with the side surface 103b of the shaft 103 and becomes possible of engaging therewith.

In this construction, the operation of the clip 110 when inserting the shaft 103 into the yoke 101 is the same as that in the fifth embodiment, and therefore its repetitive explanation is omitted.

As discussed above, the shaft temporary holding clip in the fifth and sixth embodiments includes the fitting portion fitted on the side end of one of the holding members along its configuration, and the support portion formed so as to protrude from the internal side end of this fitting portion in the direction inclined more inwards at the predetermined angle than the direction orthogonal to the axial direction of the bolt, of which the flexure acting in the outer direction with the internal side end serving as the fulcrum falls within the limit of elasticity. The clip further includes the cylindrical engagement portion formed integrally with the front side end of the support portion and internally fitted into the nut hole of the bolt hole so as to be movable in the axial direction of the bolt. Therefore, a part of the shaft slides while pushing the support portion when inserting the shaft in between the holding members, and the engagement portion thereby moves back into the nut hole or the bolt hole to permit the shaft to pass through. When the shaft is intruded into the concave area between the holding members, the engagement portion elastically returns to the original position and engages with the shaft, thus temporarily holding the shaft. It is therefore feasible to perform the operation of screwing at first the bolt into the nut by inserting the bolt from the bolt hole with the single hand, and to prevent a deviation between the shaft and the holding members of the yoke during the operation of fastening the bolt. Besides, the configuration of the clip is simple, and the clip can be therefore manufactured at the low cost.

Further, the bolt easily penetrates inside the cylindrical portion of the engagement portion, and it is possible to avoid the interference of the bolt with the clip during the fastening operation.

Accordingly, the operation of joining the shaft to the yoke can be facilitated, the certainty and reliability of the operation can be enhanced.

What is claimed is:

1. A connection structure of a yoke and a shaft, comprising:
    a shaft including a pair of flat surfaces formed in parallel to each other on an outer peripheral surface of a front side end thereof;
    a yoke having a connection portion, formed at one side end thereof, for connecting said shaft, and having the other side end connected to a universal joint;
    said connection portion including: holding members, for holding the flat surfaces of said shaft, taking substantially a U-shape in section within a plane orthogonal to an axial direction thereof;
    a screw hole formed in the vicinity of one side end of the U-shape; and
    a bolt hole formed in the vicinity of the other side end thereof, concentric with said screw hole and having a diameter larger than said screw hole, said connection structure functioning to insert from said bolt hole a bolt fitted thereon with a cam member having a fitting hole by inserting said shaft in between said holding members, then screw said bolt into said screw hole, thus connect said shaft to said connection portion, and perform centering of said shaft with the rotations of said cam member, wherein said cam member is movable on said bolt facing at least a part of said shaft in the axial direction of said bolt, and
    said bolt is provided with a frictional engagement portion frictionally engaging with said cam member and rotating said cam member when said bolt is screwed into said screw hole and fastened thereto.

2. A connection structure of a yoke and a shaft according to claim 1, wherein the part of said shaft includes a screw portion of said bolt,
    said frictional engagement portion of said bolt includes a large-diameter portion having a diameter larger than a diameter of the fitting hole of said cam member that is formed between the screw portion and a head of said bolt, and
    said large-diameter portion is press-fitted into the fitting hole when said bolt is screwed into the screw hole and fastened thereto.

3. A connection structure of a yoke and a shaft, comprising:

a shaft including a pair of flat surfaces formed in parallel to each other on an outer peripheral surface of a front side end thereof;

a yoke having a connection portion, formed at one side end thereof, for connecting said shaft, and having the other side end connected to a universal joint, said connection portion including: holding members, for holding the flat surfaces of said shaft, taking substantially a U-shape in section within a plane orthogonal to an axial direction thereof;

a screw hole formed in the vicinity of one side end of the U-shape; and a bolt hole formed in the vicinity of the other side end thereof, concentric with said screw hole and having a diameter larger than said screw hole, said connection structure functioning to insert from said bolt hole a bolt externally fitted with a cam member having a fitting hole by inserting said shaft in between said holding members, then screw said bolt into said screw hole, thus connect said shaft to said connection portion, and perform centering of said shaft with the rotations of said cam member, wherein an inside diameter of the fitting hole of said cam member has a dimension enough to be movable with respect to a screw portion of said bolt, said bolt is provided with a large-diameter portion between the screw portion and the head, having such an outside diameter larger than an inside diameter of the fitting hole and a length as to be press-fittable into the fitting hole and to generate a frictional resisting force capable of centering after being press-fitted, and the screw portion is set to such a length that at least said large-diameter portion is not press-fitted into the fitting hole till a front side end of the screw portion is at first screwed into the screw hole.

4. A shaft temporary holding clip of a lateral insert type yoke, for connecting a shaft including a pair of flat surfaces formed in parallel to each other on an outer peripheral surface of a front side end thereof to its one side end, and connecting the other side end thereof to a universal joint, said clip comprising:

holding members, of which a portion for connecting said shaft is formed in a U- shape in section within a plane orthogonal to an axial direction thereof, for holding the flat surfaces of said shaft;

a nut hole, formed in the vicinity of a side end of one of said holding members, into which a nut is fixedly fitted;

a bolt hole, formed in the vicinity of a side end of the other of said holding members, concentric with said nut hole and having a diameter larger than said nut hole, said clip working to temporarily hold said shaft till said bolt is inserted from said bolt hole and screwed into said nut after said shaft has been inserted in between said holding members, and being attached to a predetermined position of said holding members;

a fitting portion fitted on a side end of one of said holding members inwards from outside along its configuration;

a support portion formed so as to protrude from an internal side end portion of said fitting portion in a direction more inclined inwards by a predetermined angle than in a direction orthogonal to the axial direction of said bolt, of which a flexure acting in an outer direction with the internal side end serving as a fulcrum falls within a limit of elasticity; and an engagement portion integrally formed at a front side end of said support portion, and fitted into said nut hole or said bolt hole so as to be movable in the axial direction of said bolt, wherein a part of said shaft slides while pushing said support portion when inserting said shaft in between said holding members, said engagement portion thereby moves back into said nut hole or said bolt hole to permit said shaft to pass through, and when said shaft is intruded into a concave area between said holding members, said engagement portion elastically returns to an original position and engages with said shaft.

* * * * *